(12) United States Patent
Tanaka et al.

(10) Patent No.: US 8,922,904 B2
(45) Date of Patent: Dec. 30, 2014

(54) ZOOM LENS AND IMAGING APPARATUS

(71) Applicant: FUJIFILM Corporation, Tokyo (JP)

(72) Inventors: Takashi Tanaka, Saitama-ken (JP); Michio Cho, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/093,208

(22) Filed: Nov. 29, 2013

(65) Prior Publication Data

US 2014/0085733 A1 Mar. 27, 2014

Related U.S. Application Data

(63) Continuation of application No. PCT/JP2012/003985, filed on Jun. 19, 2012.

(30) Foreign Application Priority Data

Jun. 21, 2011 (JP) ................. 2011-137062

(51) Int. Cl.
*G02B 15/14* (2006.01)
*G02B 15/173* (2006.01)

(52) U.S. Cl.
CPC .............. *G02B 15/14* (2013.01); *G02B 15/173* (2013.01)
USPC .......................................................... 359/683

(58) Field of Classification Search
CPC .............................. G02B 15/14; G02B 15/173
USPC .......................... 359/676, 683, 684
See application file for complete search history.

(56) References Cited

U.S. PATENT DOCUMENTS

| | | |
|---|---|---|
| 5,185,678 A | 2/1993 | Arimoto |
| 5,872,659 A | 2/1999 | Kohno |
| 6,010,537 A | 1/2000 | Konno et al. |
| 2008/0259464 A1 | 10/2008 | Kuroda et al. |

FOREIGN PATENT DOCUMENTS

| | | |
|---|---|---|
| JP | 04-70707 | 3/1992 |
| JP | 09-197271 | 7/1997 |
| JP | 11-64728 | 3/1999 |
| JP | 2011-090190 | 5/2011 |
| WO | WO2006/095544 | 9/2006 |

OTHER PUBLICATIONS

NPL English Translation of International Preliminary Report on Patentability prepared for PCT_JP2012_003985 on Dec. 21, 2013.*
International Search Report, PCT/JP2012/003985, Oct. 2, 2012.

\* cited by examiner

*Primary Examiner* — David N Spector
(74) *Attorney, Agent, or Firm* — Young & Thompson

(57) ABSTRACT

A zoom lens substantially consists of, in order from the object side, a positive first lens group, a negative second lens group, a positive third lens group, a positive fourth lens group, and a negative fifth lens group. When varying magnification from the wide angle end to the telephoto end, a distance between the first lens group and the second lens group is always increased, a distance between the second lens group and the third lens group is always decreased, a distance between the third lens group and the fourth lens group is always decreased, and a distance between the fourth lens group and the fifth lens group is changed, while all of the lens groups are moved with respect to an image formation position. Formulas (Ca): $-5.00 \leq 1-(\beta_{5T})^2 < -2.5$ and (D): $0.10 < f_w/f_1 < 0.25$ are satisfied.

8 Claims, 16 Drawing Sheets

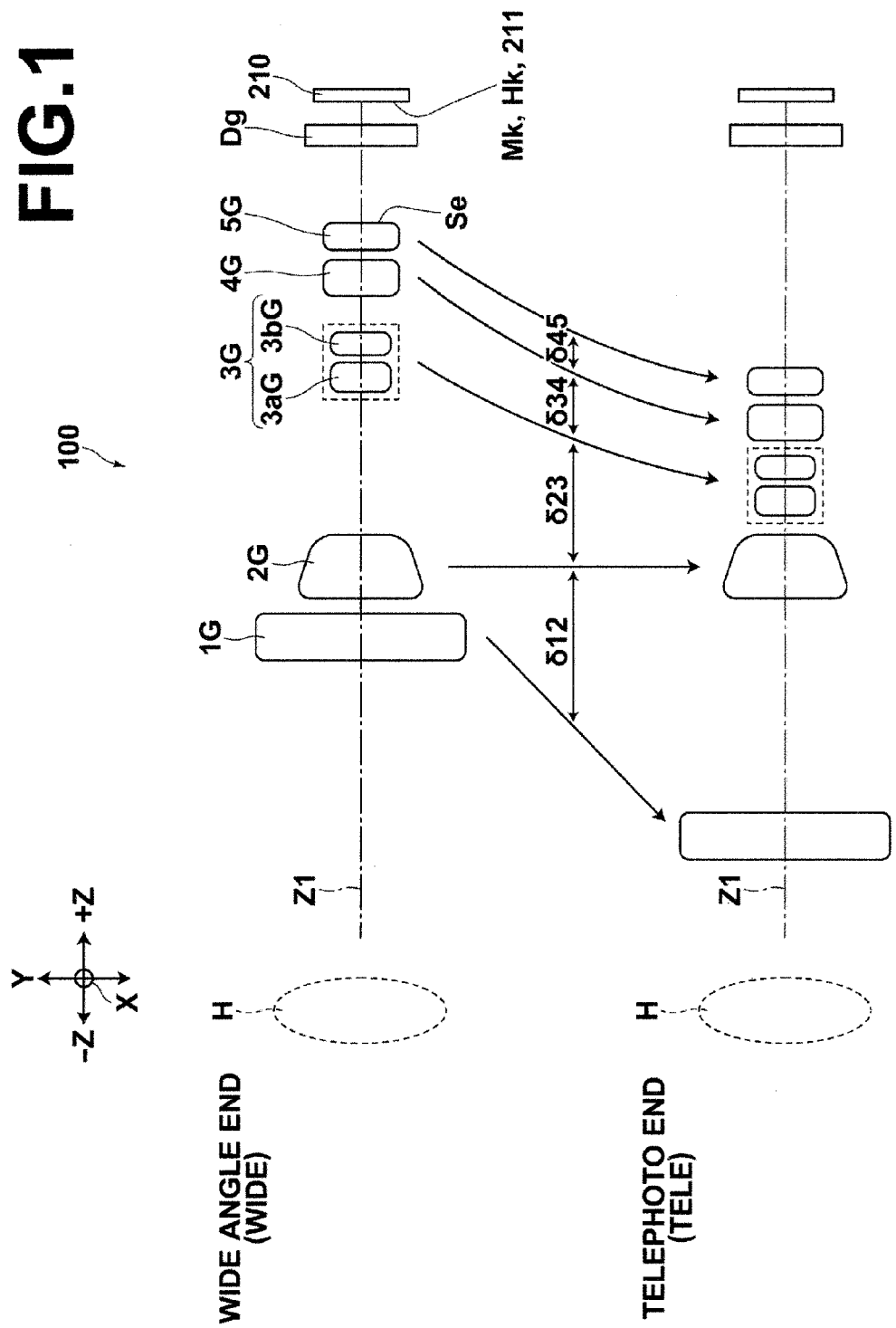

EXAMPLE 1

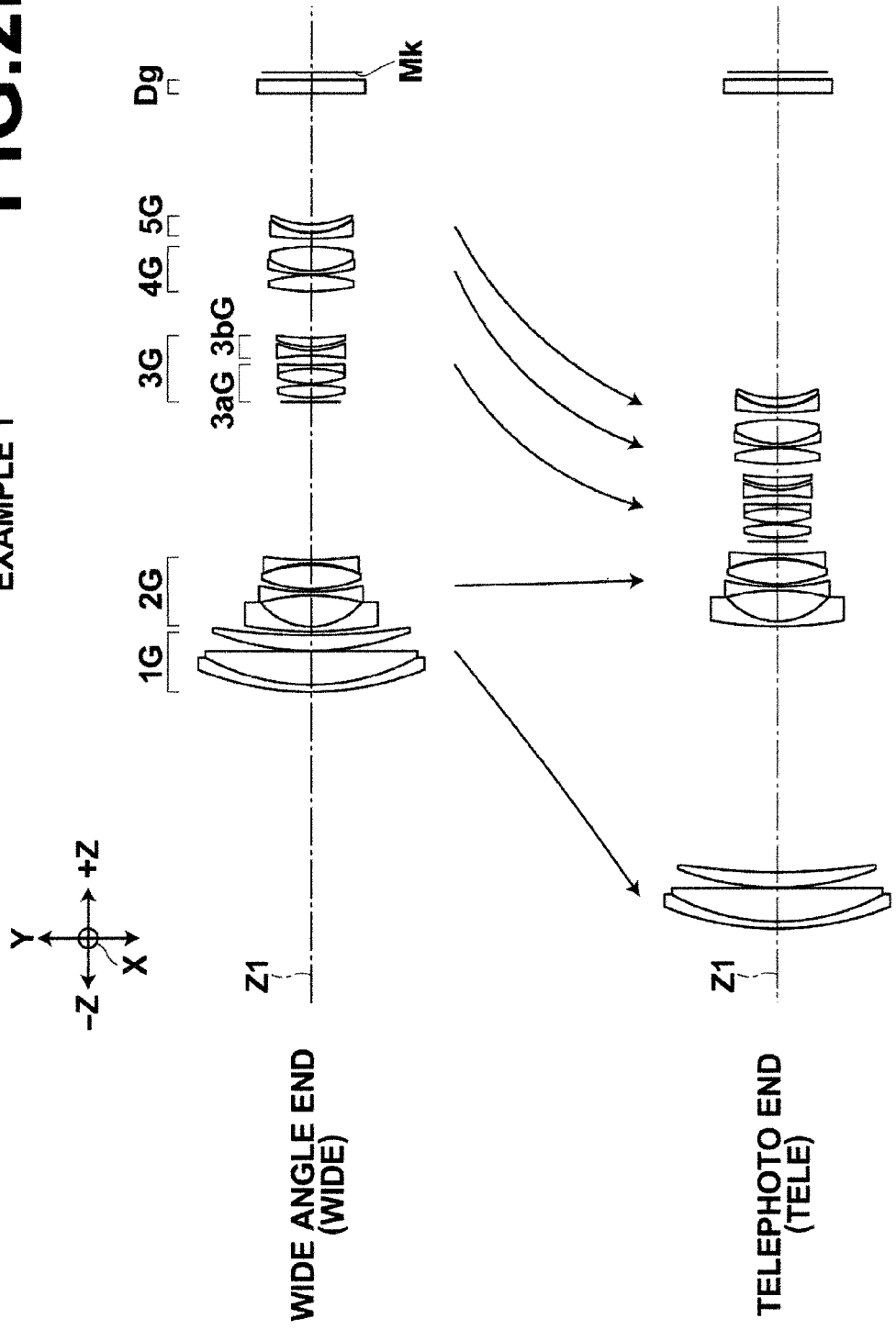

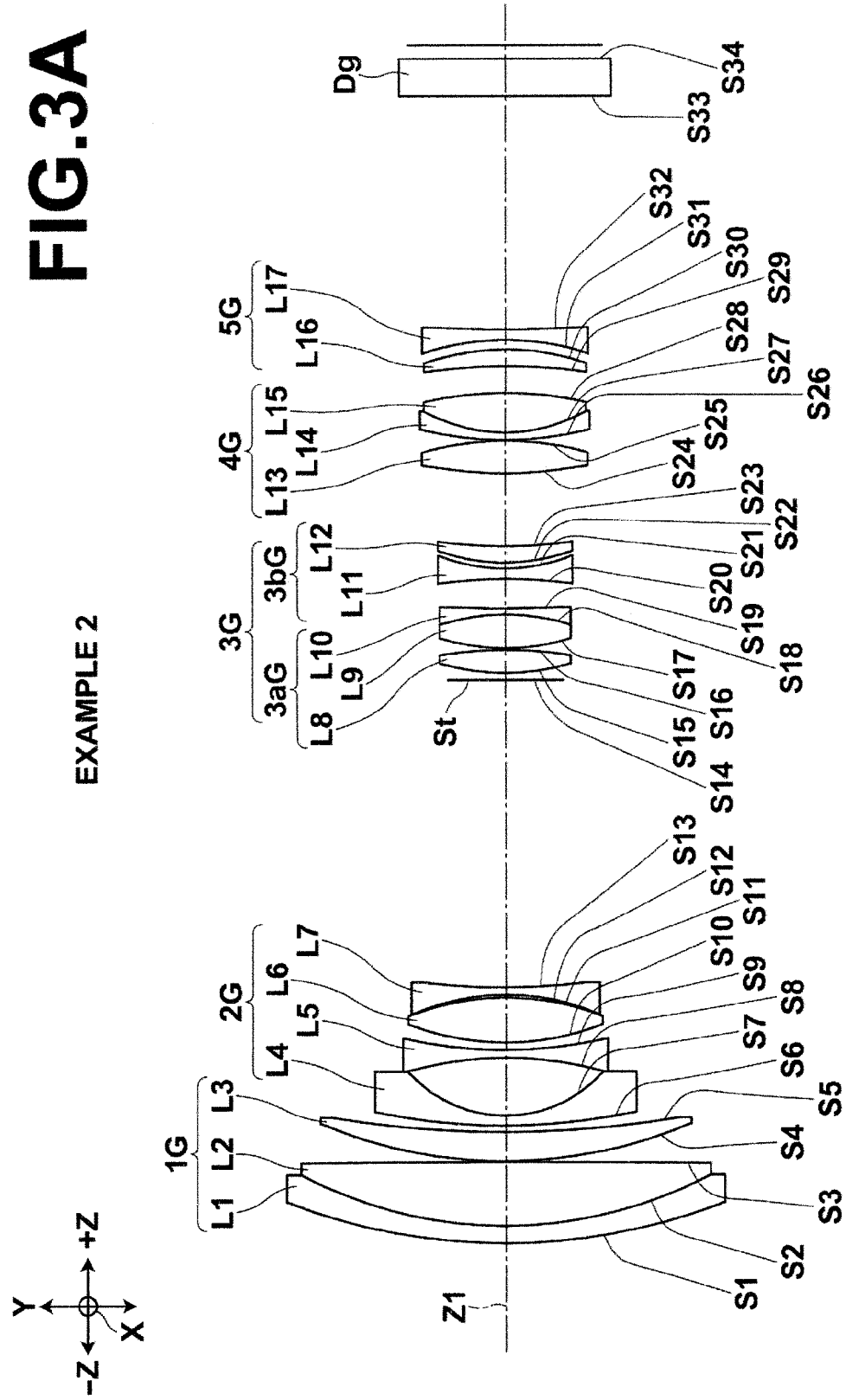

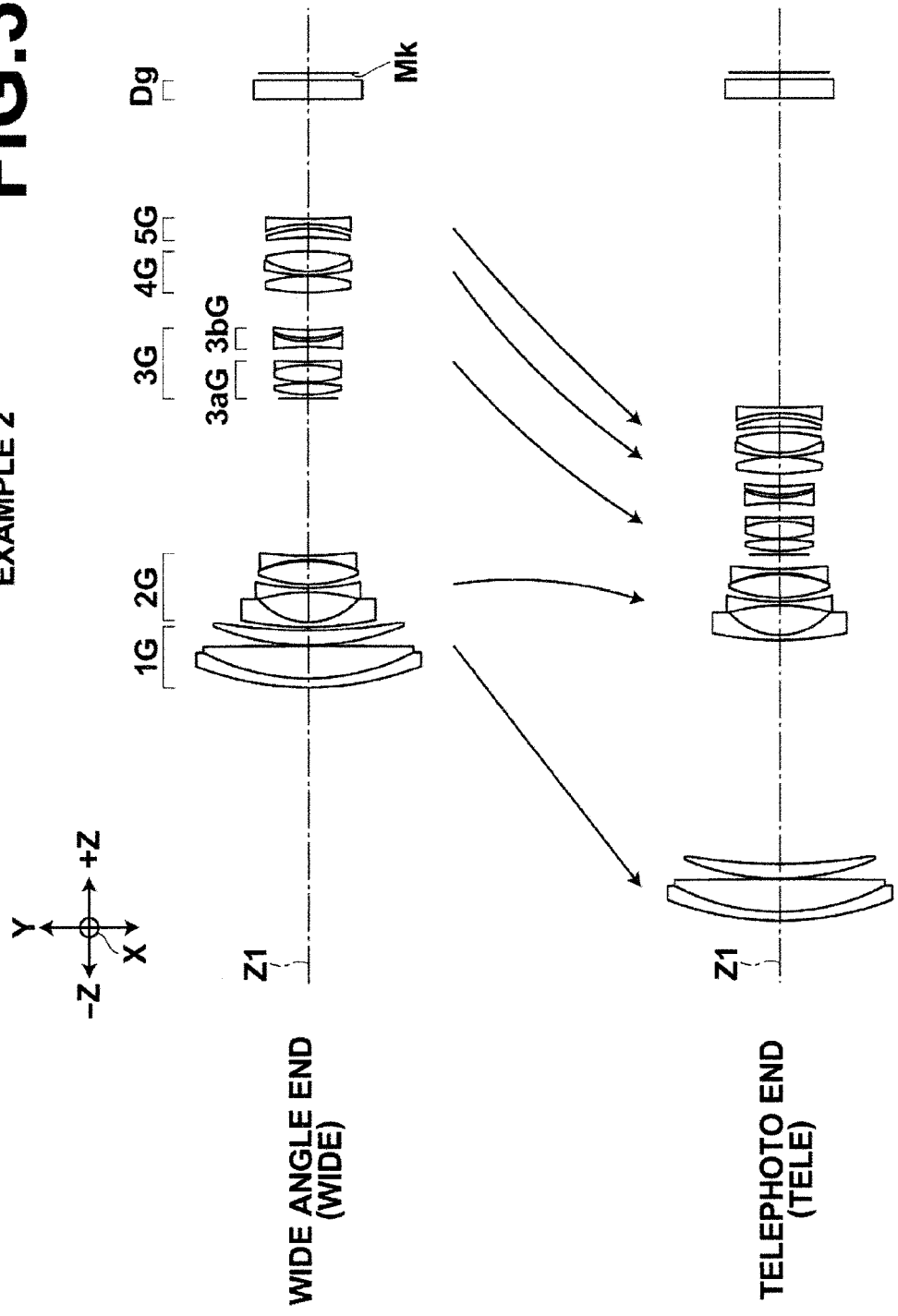

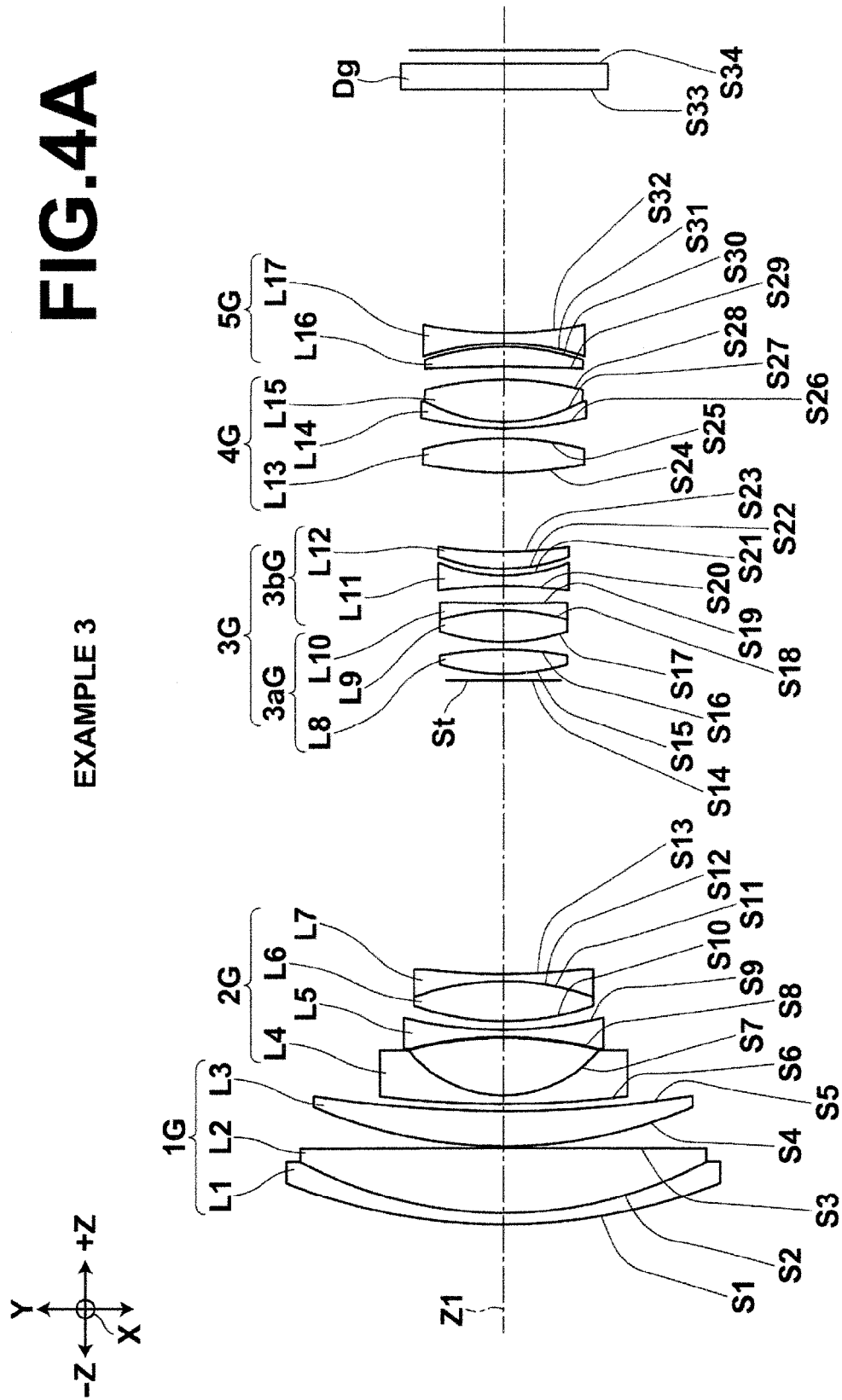

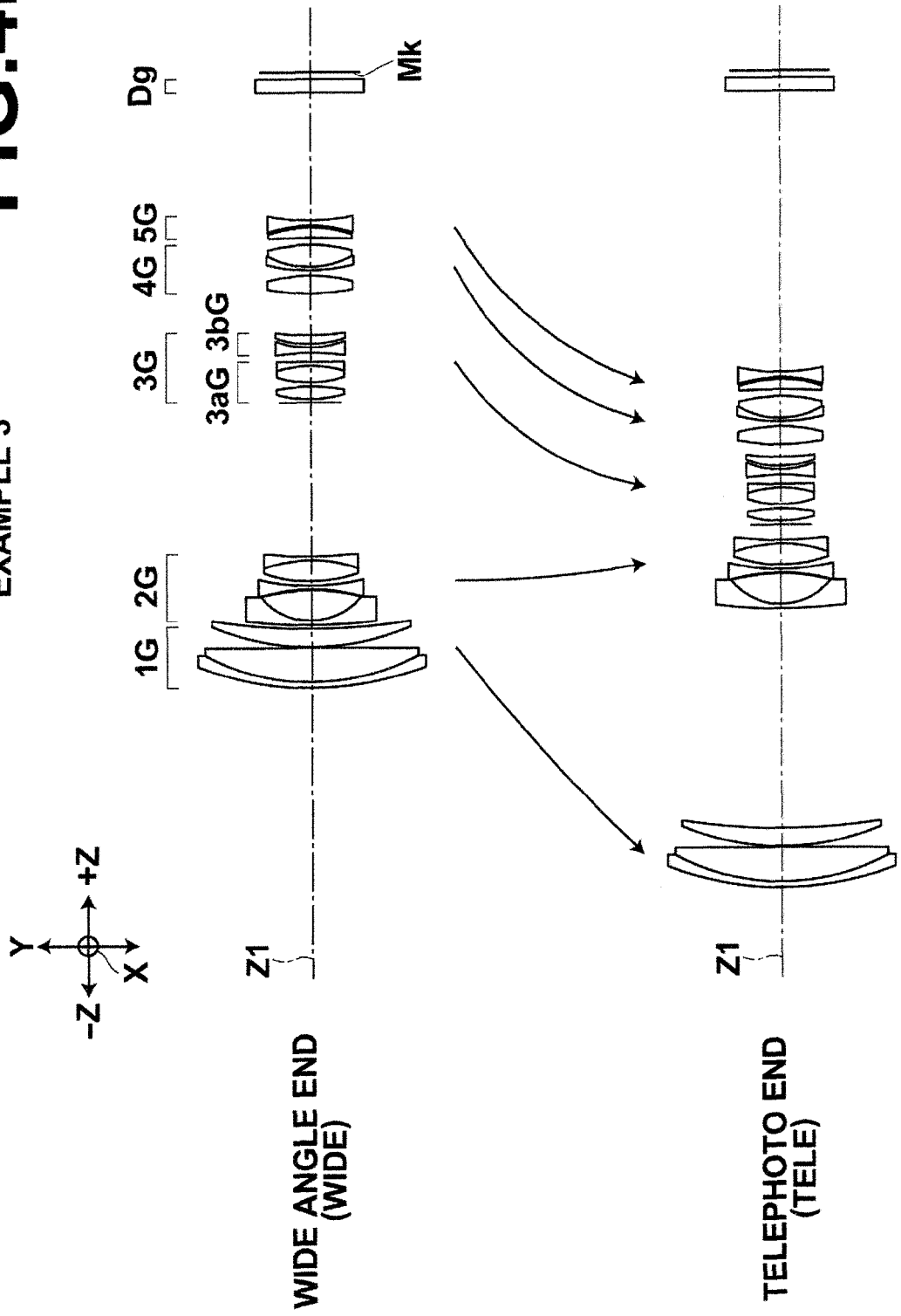

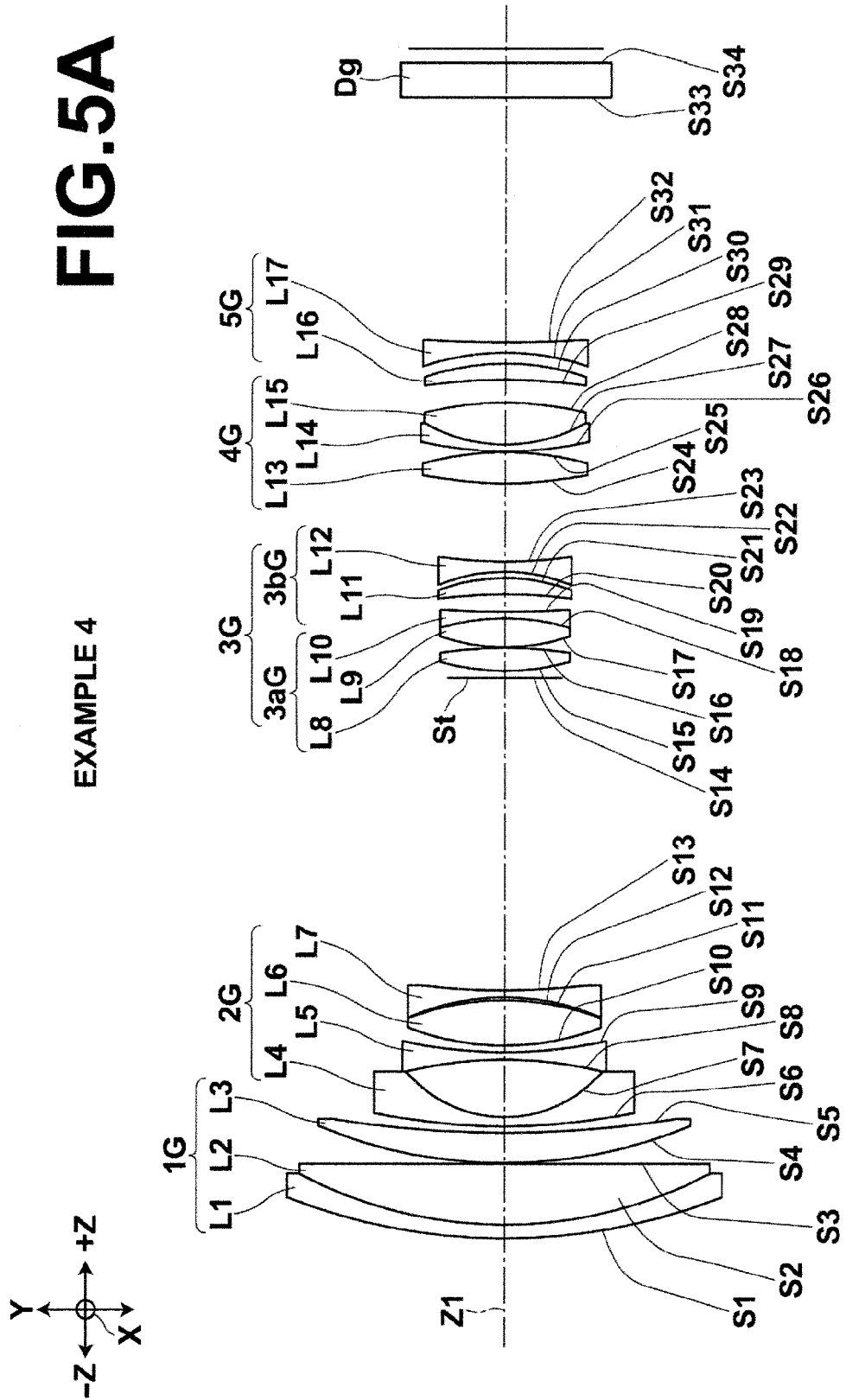

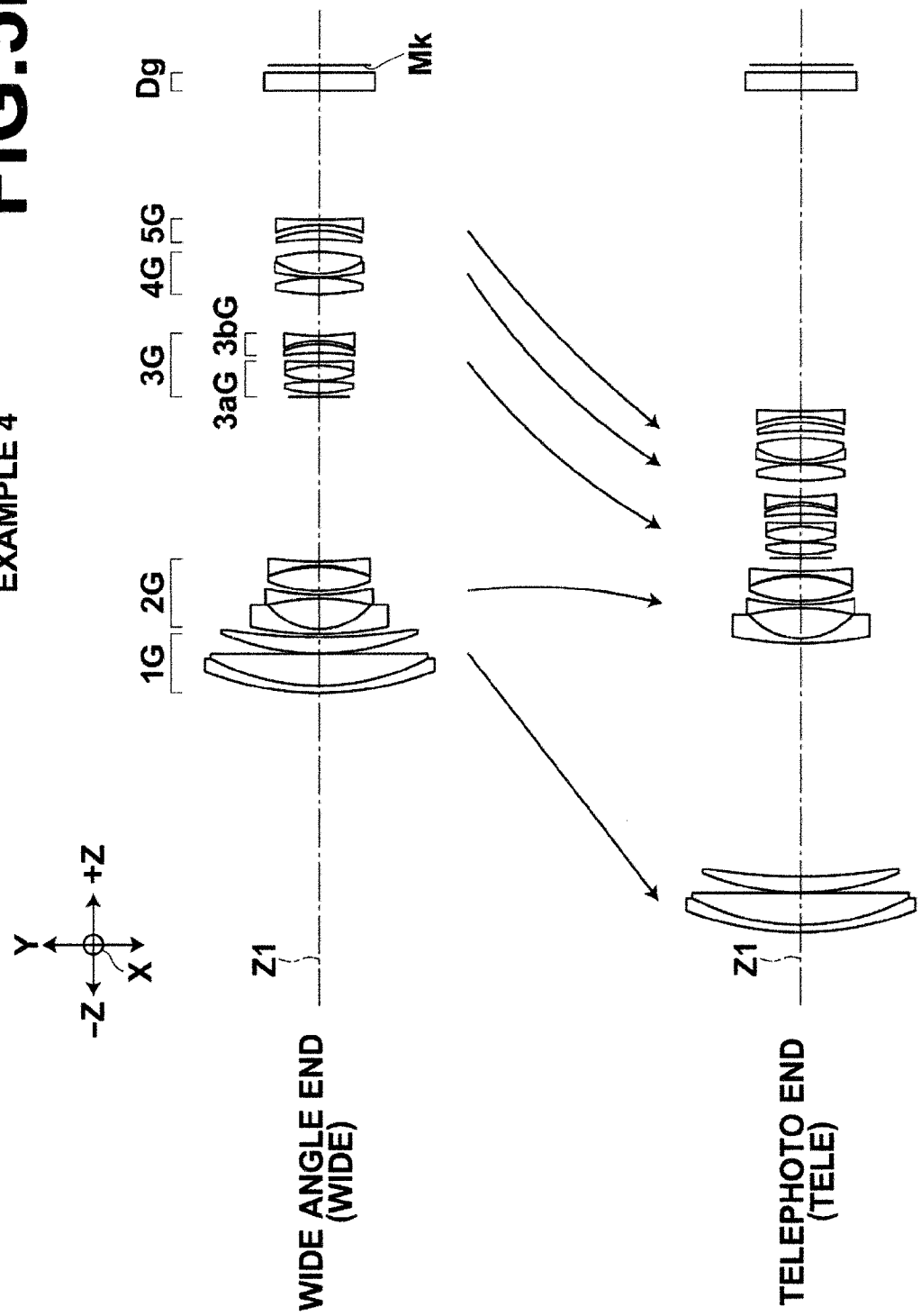

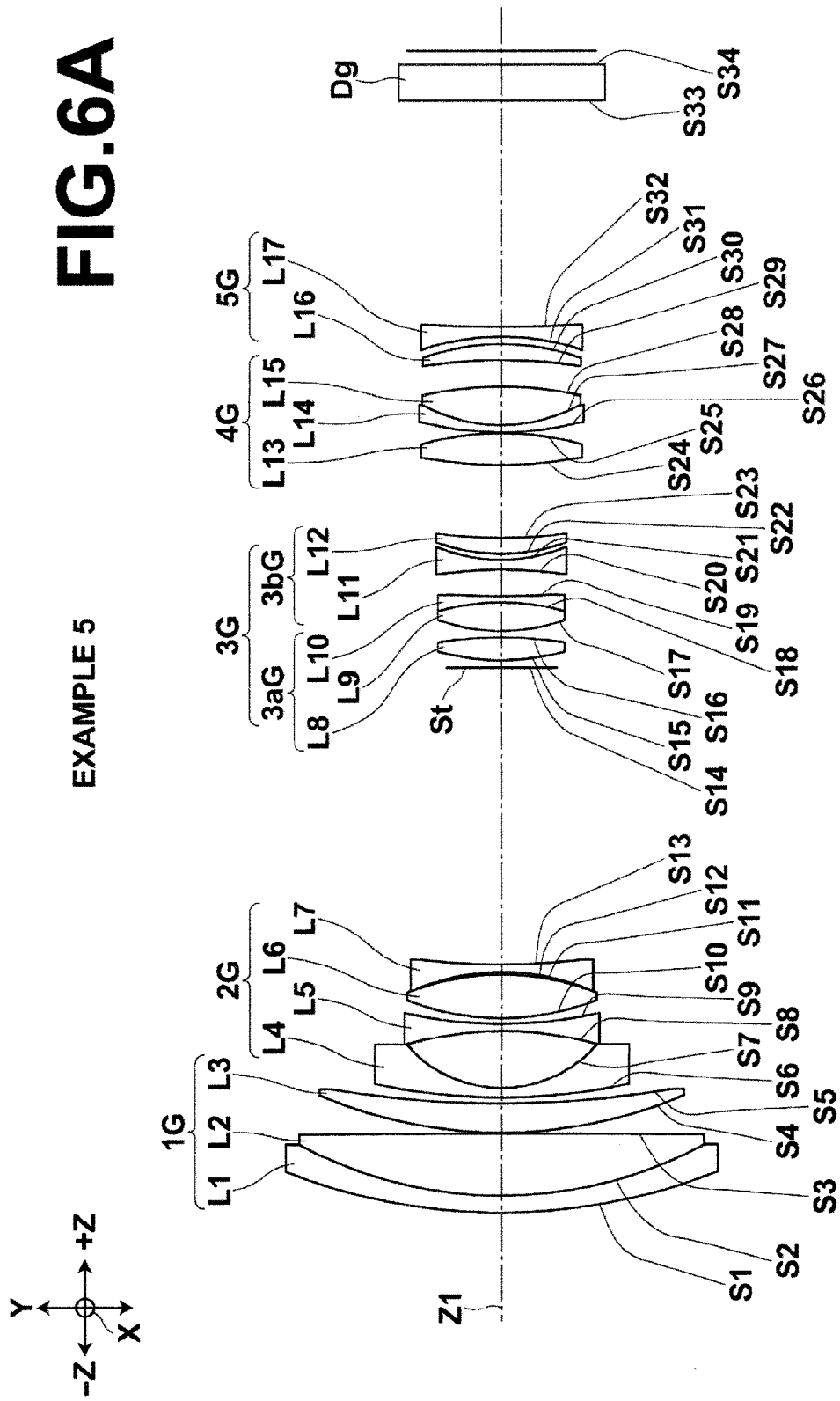

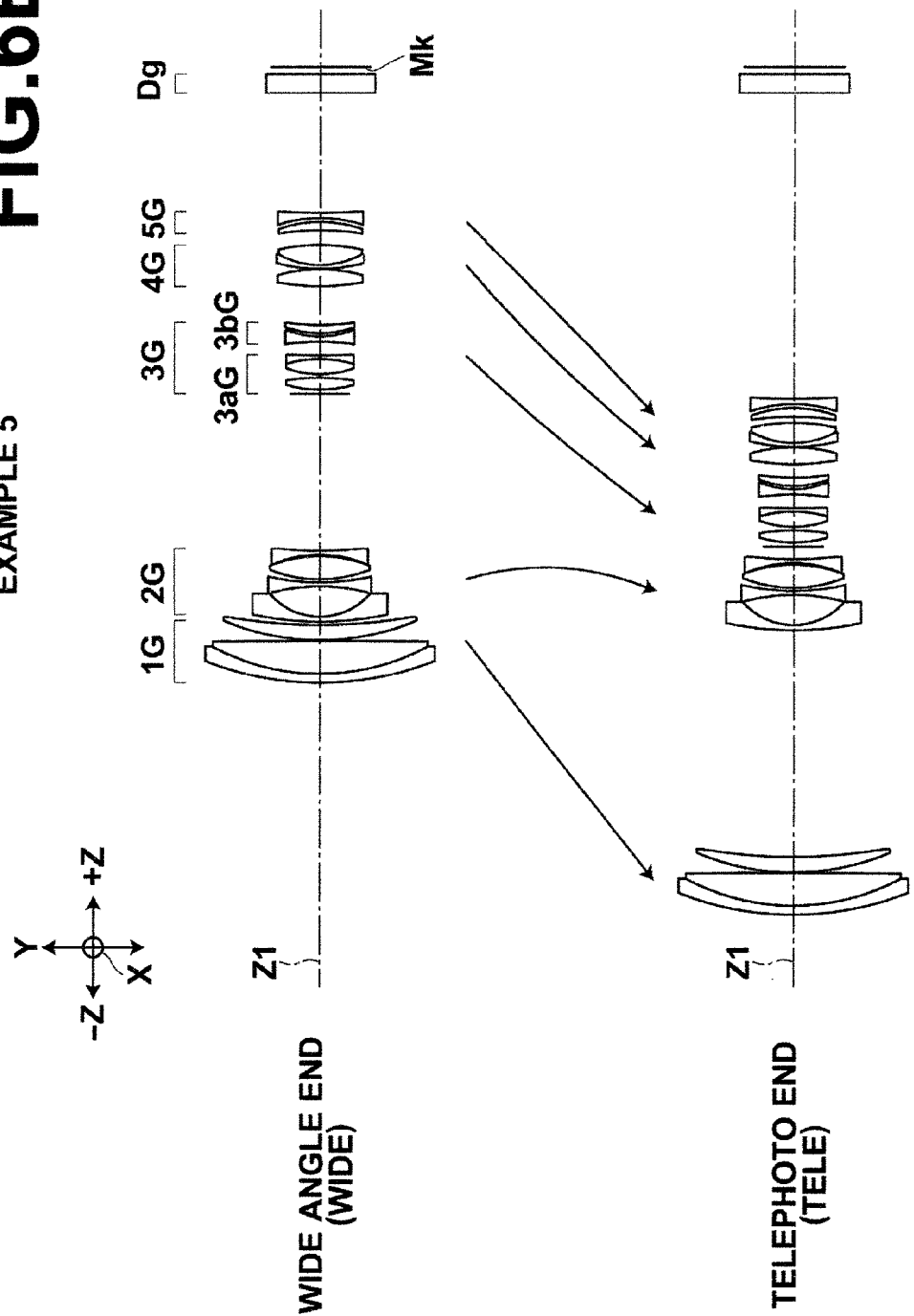

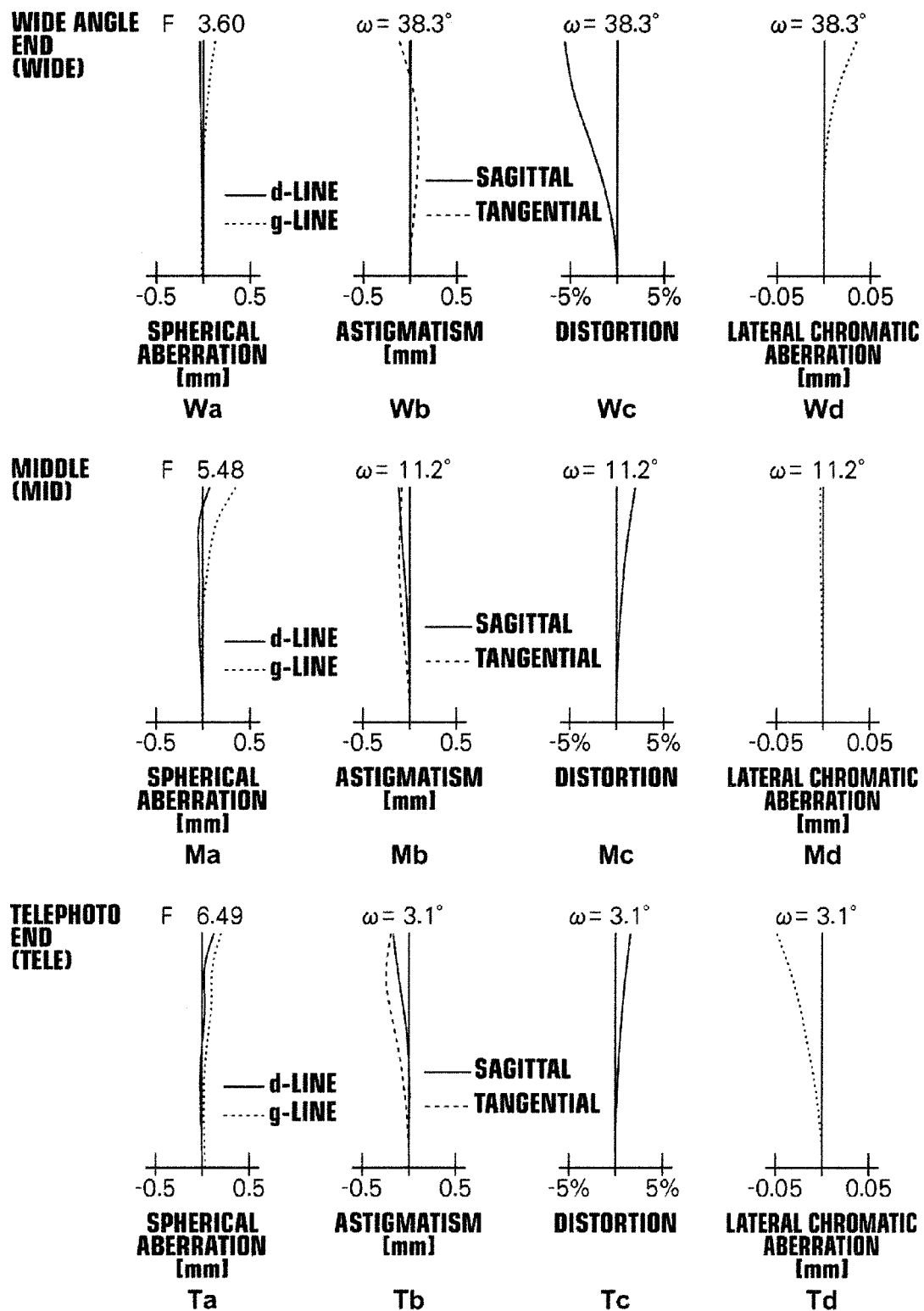

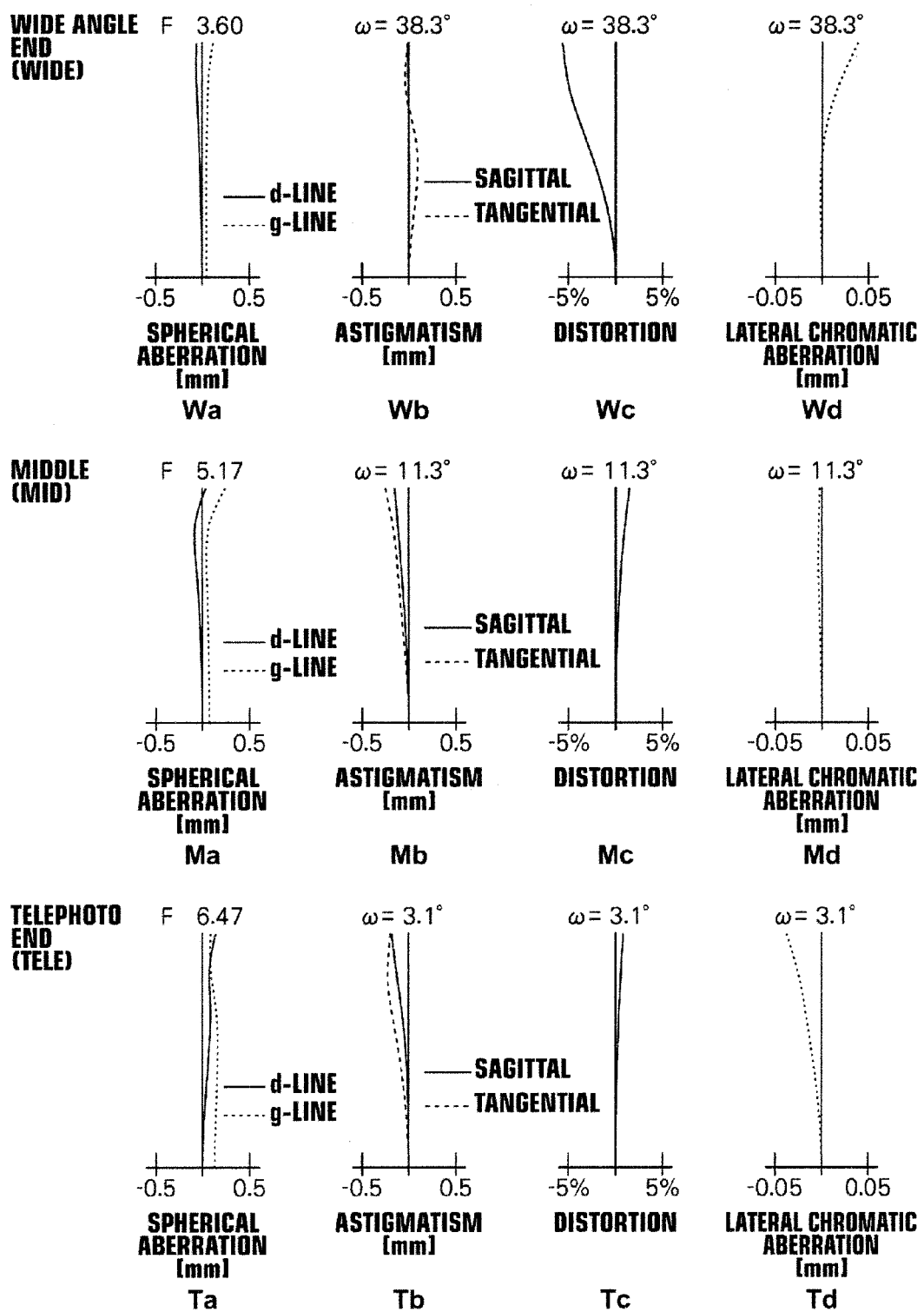

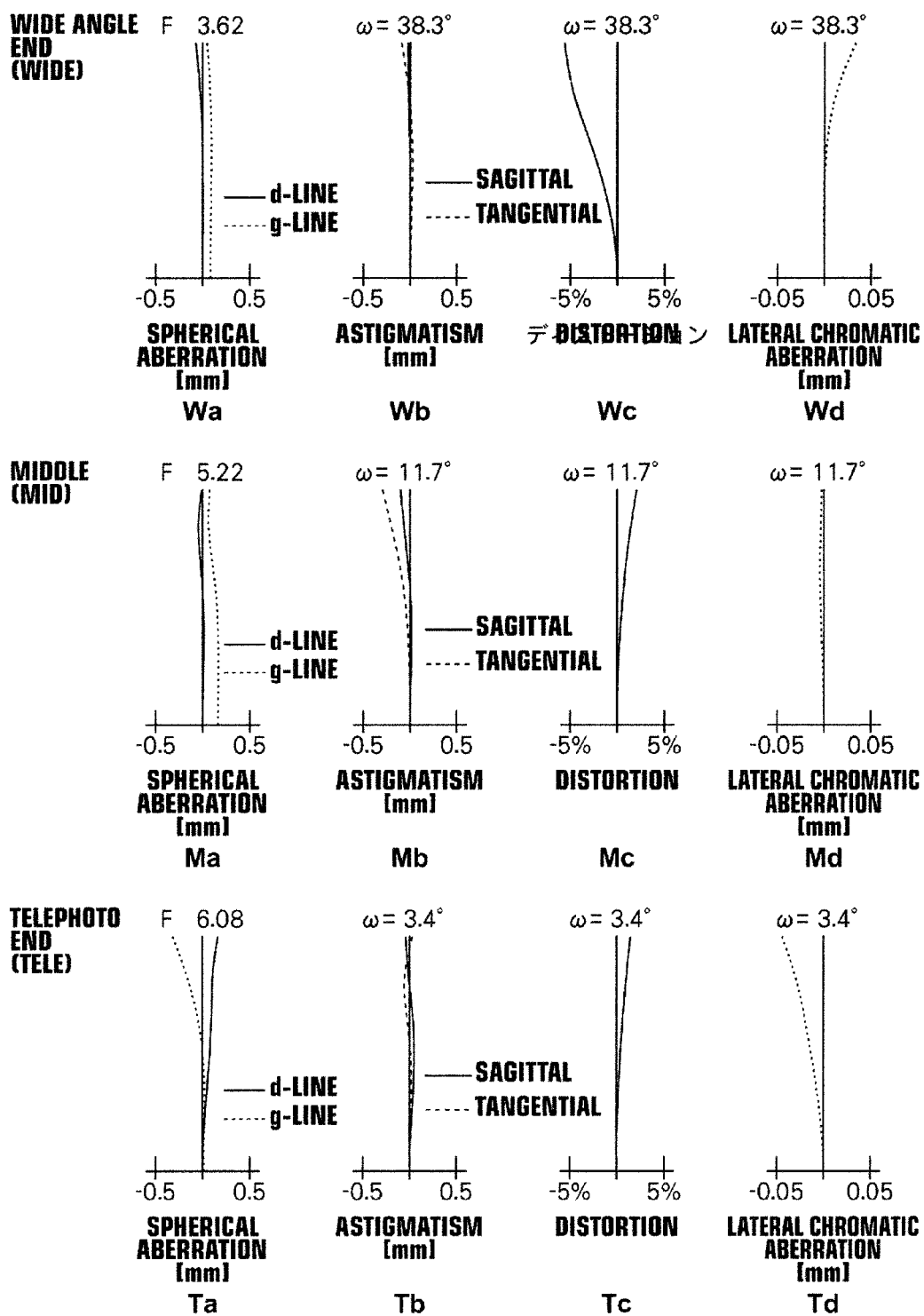

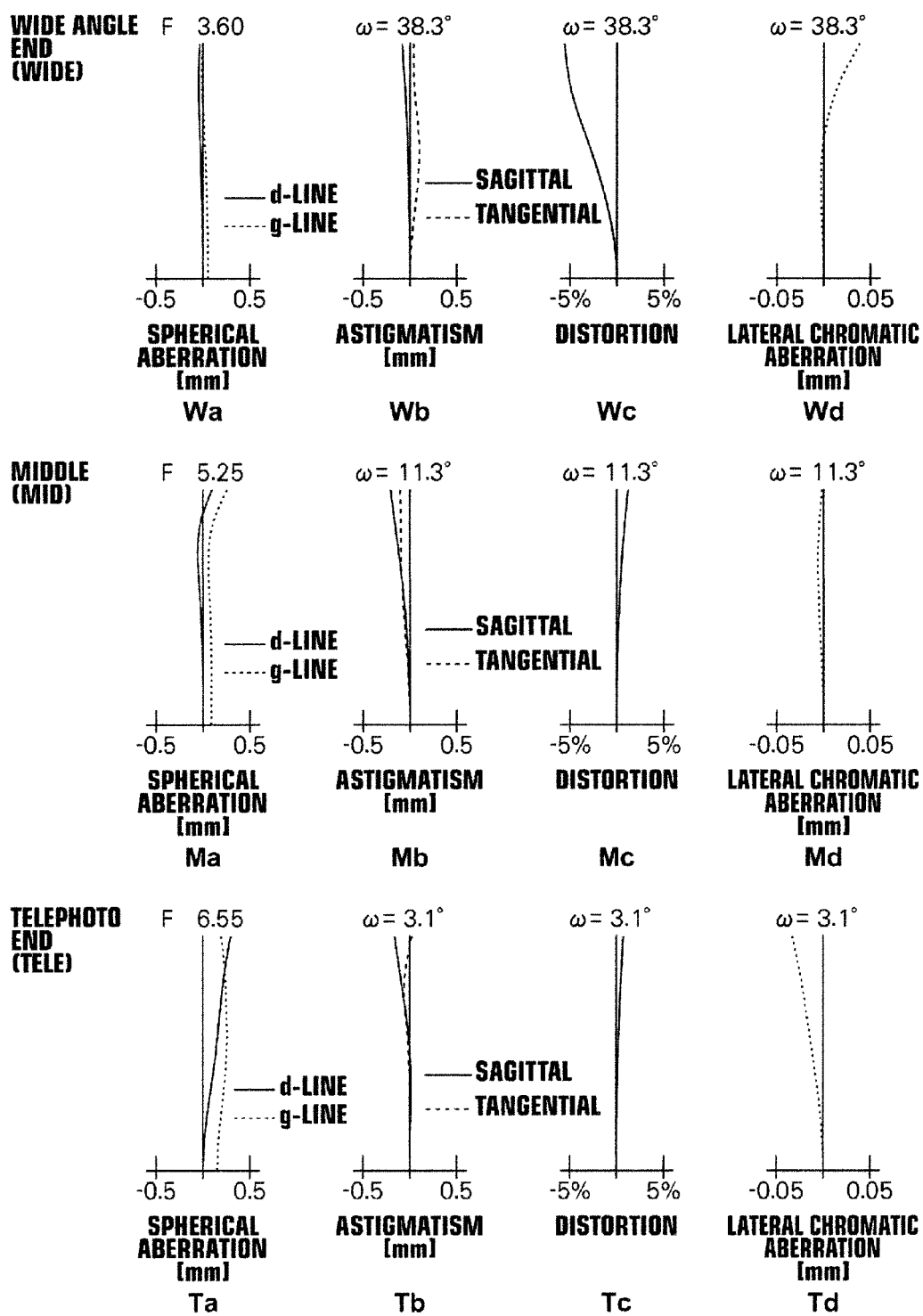

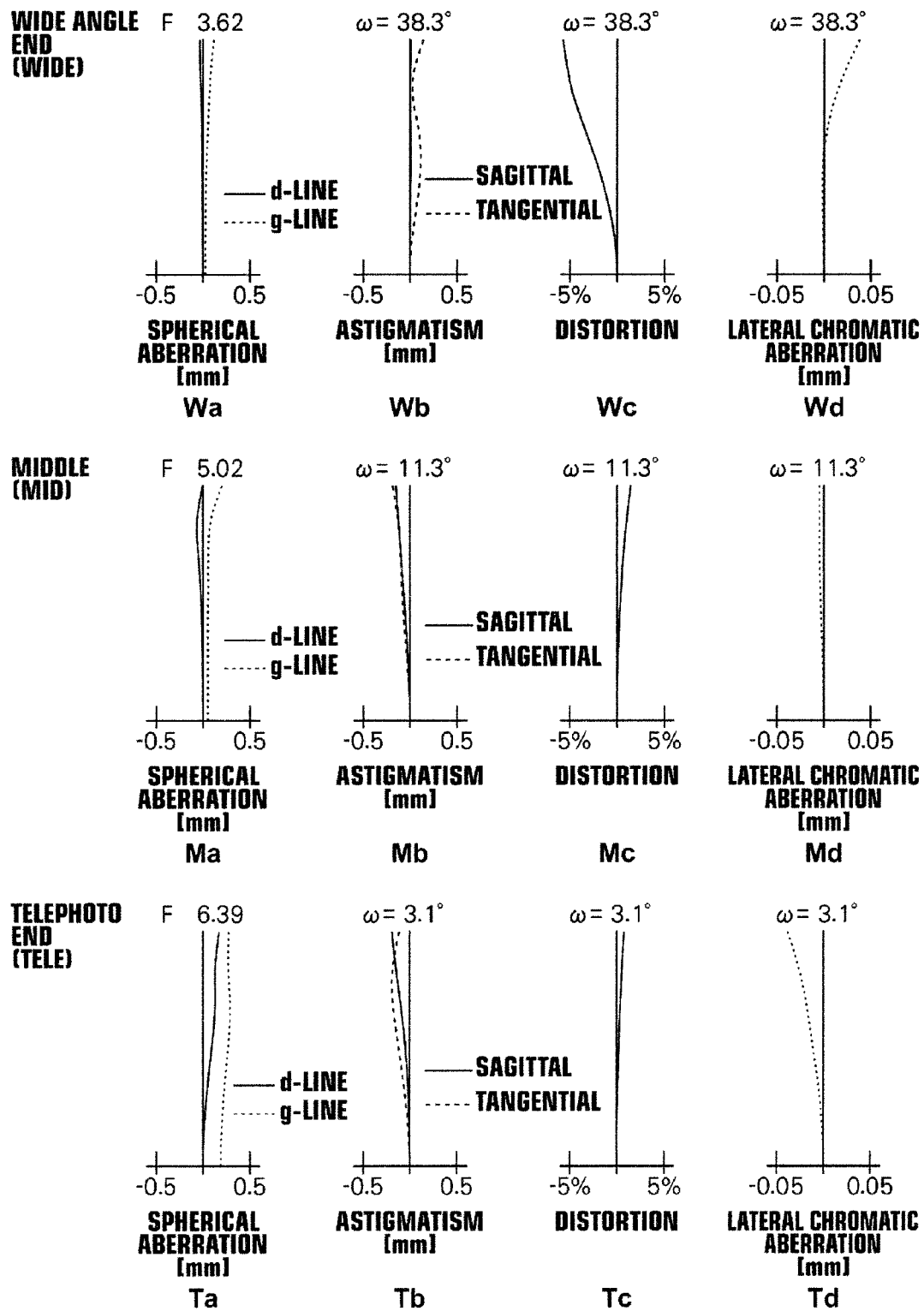

ZOOM LENS AND IMAGING APPARATUS

CROSS REFERENCE TO RELATED APPLICATIONS

This application is a continuation of International Application No. PCT/JP2012/003985 filed on Jun. 19, 2012, which claims foreign priority to Japanese Application No. 2011-137062 filed on Jun. 21, 2011. The entire contents of each of the above applications are hereby incorporated by reference.

BACKGROUND OF THE INVENTION

1. Field of the Invention

The present invention relates to a zoom lens having a high variable magnification ratio used in electronic cameras such as digital cameras, video cameras, broadcasting cameras, surveillance cameras and the like, and to an imaging apparatus including the zoom lens.

2. Description of the Related Art

Conventionally, a zoom lens substantially consists of: a first lens group having positive refractive power; a second lens group having negative refractive power; a third lens group having positive refractive power; a fourth lens group having positive refractive power; and a fifth lens group having negative refractive power, which are arranged in this order from the object side, is known as a zoom lens having relatively a high variable magnification ratio. The zoom lens with such a lens construction is known to be appropriate for realizing both a high variable magnification ratio and a reduction in size (see Japanese Unexamined Patent Publication No. 4(1992)-070707, Japanese Unexamined Patent Publication No. 9(1997)-197271, and Japanese Unexamined Patent Publication No. 11(1999)-064728).

SUMMARY OF THE INVENTION

Recently, there is demand for a zoom lens, which is compact, and yet has a high variable magnification ratio, e.g., a zoom lens which has a high variable magnification ratio of over 12×, and yet which is compact and capable of high performance.

However, conventionally known compact and high performance zoom lenses, e.g., the zoom lenses disclosed in Japanese Unexamined Patent Publication No. 4(1992)-070707, Japanese Unexamined Patent Publication No. 9(1997)-197271, and Japanese Unexamined Patent Publication No. 11(1999)-064728, have variable magnification ratios of less than 10×, and cannot necessarily be said to have high variable magnification ratios.

The present invention has been developed in view of the foregoing circumstances. It is an object of the present invention to provide a zoom lens, which has a high variable magnification ratio, and yet which is compact and capable of high performance, and an imaging apparatus including the zoom lens.

A zoom lens of the present invention substantially consists of:
a first lens group having positive refractive power;
a second lens group having negative refractive power;
a third lens group having positive refractive power;
a fourth lens group having positive refractive power; and
a fifth lens group having negative refractive power, which are arranged in this order from an object side,
wherein when varying magnification from a wide angle end to a telephoto end, the distance between the first lens group and the second lens group is consistently increased, the distance between the second lens group and the third lens group is consistently decreased, the distance between the third lens group and the fourth lens group is consistently decreased, and the distance between the fourth lens group and the fifth lens group is changed, while all of the lens groups are moved with respect to an image formation position,
wherein the following formula (D) is satisfied:

$$0.10 < f_w/f_1 < 0.25 \quad \text{(D), where}$$

$f_w$ is a focal length of the entire lens system at the wide angle end; and $f_1$ is a focal length of the first lens group.

The zoom lens can be substantially composed of five lens groups. In this case, the expression "zoom lens which is substantially composed of n lens groups" refers to a zoom lens that includes lenses substantially without any refractive power; optical elements other than lenses such as apertures and glass covers; and mechanical components such as lens flanges, lens barrels, imaging elements, and camera shake correction mechanisms; in addition to the n lens groups.

It is more desirable for the zoom lens to satisfy formula (D'): $0.15 < f_w/f_1 < 0.20$.

It is desirable that when the point of focus is shifted from an infinity side to a near side and focused, only the fifth lens group is shifted to the image side.

It is desirable for the zoom lens to satisfy formula (C): $-0.6 < 1 - (\beta_{5T})^2 < -2.5$, and more desirable to satisfy formula (C'): $-5.5 < 1 - (\beta_{5T})^2 < -2.9$, wherein $\beta_{5T}$ is an image formation magnification of the fifth lens group when focusing on infinity at the telephoto end.

An imaging apparatus of the present invention is equipped with the zoom lens of the present invention.

The zoom lens and the imaging apparatus including the zoom lens according to the present invention substantially consists of:
a first lens group having positive refractive power;
a second lens group having negative refractive power;
a third lens group having positive refractive power;
a fourth lens group having positive refractive power; and
a fifth lens group having negative refractive power, which are arranged in this order from the object side of the zoom lens,
wherein when varying magnification from the wide angle end to the telephoto end, a distance between the first lens group and the second lens group is consistently increased, a distance between the second lens group and the third lens group is consistently decreased, a distance between the third lens group and the fourth lens group is consistently decreased, and a distance between the fourth lens group and the fifth lens group is changed such that each of the lens groups is moved with respect to an image formation position,
wherein the following formula (D): $0.10 < f_w/f_1 < 0.25$ is satisfied. This enables the zoom lens to have a high variable magnification ratio, and yet to be compact and capable of high performance.

Thus, for example, a zoom lens which has a full angle of view at a wide angle end exceeding 75°, that is, a large angle of view, and which further has a high variable magnification ratio exceeding 12×, and yet is compact and capable of high performance can be obtained.

Formula (D) regulates the ratio of the focal length of the entire lens system at a wide angle end to the focal length of the first lens group 1G. If the zoom lens is constructed in such a manner that the value of $f_w/f_1$ is less than the lower limit defined by formula (D), the focal length of the first lens group 1G becomes too large, which causes a problem that the outer diameters of lenses of the first lens group 1G and the total length of the optical system at a telephoto end will become great. If the zoom lens is constructed in such a manner that the value of $f_w/f_1$ exceeds the upper limit defined by formula (D), the positive refractive power of the first lens group 1G becomes too strong, which will cause a problem that it becomes difficult to maintain optical performance at the telephoto end.

BRIEF DESCRIPTION OF THE DRAWINGS

FIG. 1 is a schematic cross sectional diagram illustrating the structure of a zoom lens and an imaging apparatus including the zoom lens according to an embodiment of the present invention;

FIG. 2B is a cross sectional diagram illustrating each of a case that a zoom setting of the zoom lens of Example 1 is set to a wide angle end and a case that a zoom setting thereof is set to a telephoto end;

FIG. 3A is a cross sectional diagram illustrating a zoom lens of Example 2;

FIG. 3B is a cross sectional diagram illustrating each of a case that a zoom setting of the zoom lens of Example 2 is set to the wide angle end and a case that a zoom setting thereof is set to the telephoto end;

FIG. 4A is a cross sectional diagram illustrating a zoom lens of Example 3;

FIG. 4B is a cross sectional diagram illustrating each of a case that a zoom setting of the zoom lens of Example 3 is set to the wide angle end and a case that a zoom setting thereof is set to the telephoto end;

FIG. 5A is a cross sectional diagram illustrating a zoom lens of Example 4;

FIG. 5B is a cross sectional diagram illustrating each of a case that a zoom setting of the zoom lens of Example 4 is set to the wide angle end and a case that a zoom setting thereof is set to the telephoto end;

FIG. 6A is a cross sectional diagram illustrating a zoom lens of Example 5;

FIG. 6B is a cross sectional diagram illustrating each of a case that a zoom setting of the zoom lens of Example 5 is set to the wide angle end and a case that a zoom setting thereof is set to the telephoto end;

FIG. 7 is an aberration diagram of Example 1;

FIG. 8 is an aberration diagram of Example 2;

FIG. 9 is an aberration diagram of Example 3;

FIG. 10 is an aberration diagram of Example 4; and

FIG. 11 is an aberration diagram of Example 5.

DESCRIPTION OF THE PREFERRED EMBODIMENTS

Figure 2A:
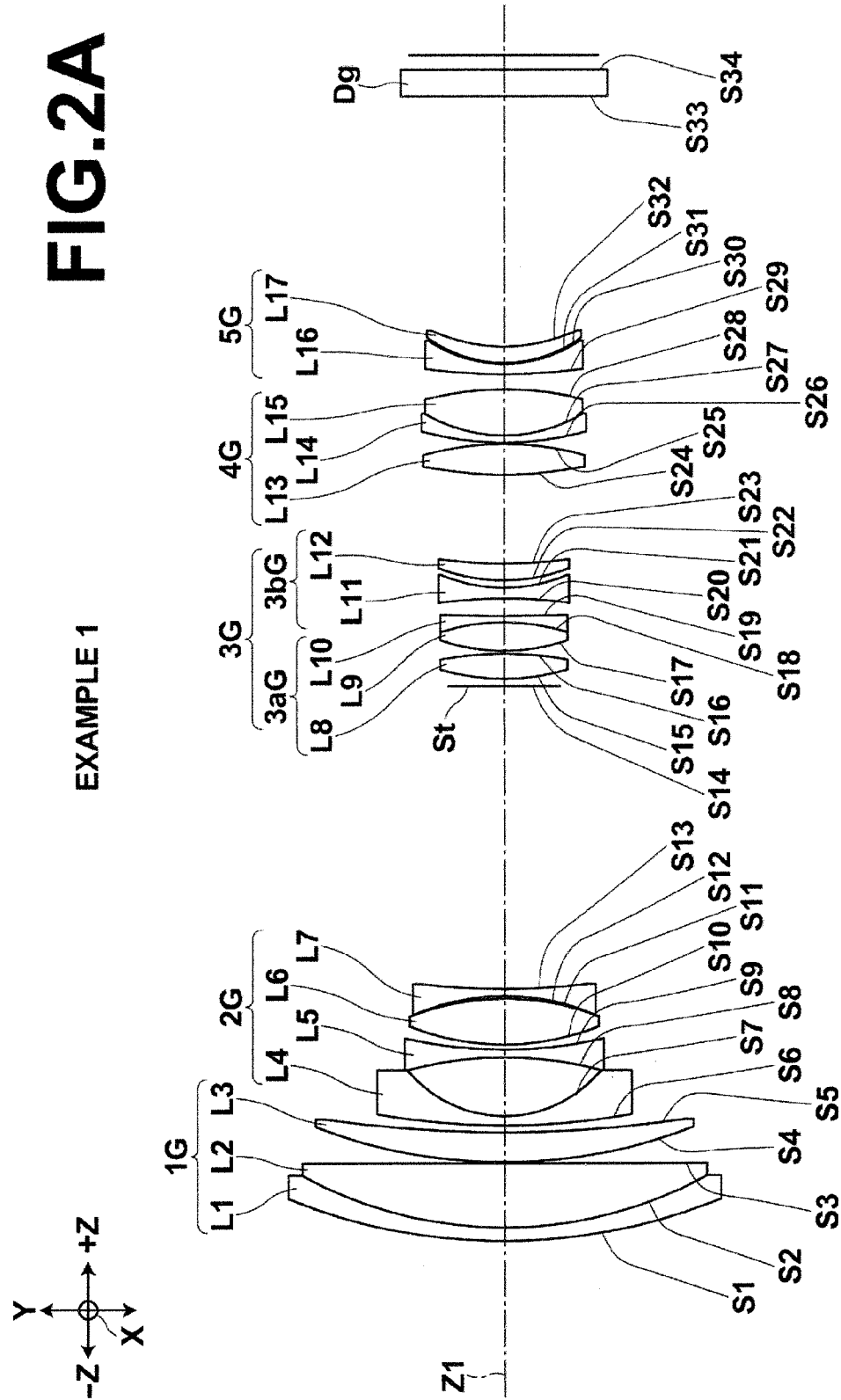
FIG. 2A is a cross sectional diagram illustrating a zoom lens of Example 1.

Hereinafter, the zoom lens and the imaging apparatus including the lens of the present invention will be described with reference to the attached drawings.

FIG. 1 is a schematic cross sectional diagram illustrating the structure of a zoom lens and an imaging apparatus including the zoom lens according to an embodiment of the present invention.

The zoom lens 100 as shown in the Figure has a high variable magnification ratio, and yet is compact and capable of high performance. The imaging apparatus 200 equipped with the zoom lens 100 is used as a digital still camera, a video camera, a surveillance camera or the like.

The zoom lens 100 is composed of a first lens group 1G having positive refractive power, a second lens group 2G having negative refractive power, a third lens group 3G having positive refractive power, a fourth lens group 4G having positive refractive power, and a fifth lens group 5G having negative refractive power, in this order from an object side (the side of −Z in the Figures).

The zoom lens 100 consistently increases a distance $\delta 12$ between the first lens group 1G and the second lens group 2G, consistently decreases a distance $\delta 23$ between the second lens group 2G and the third lens group 3G, consistently decreases a distance $\delta 34$ between the third lens group 3G and the fourth lens group 4G, and changes a distance $\delta 45$ between the fourth lens group 4G and the fifth lens group 5G, while all of the lens groups 1G through 5G are moved with respect to an image formation surface Mk which is an image formation position of the zoom lens 100, when zooming from the wide angle end to the telephoto end (continuously varying magnification). The zoom lens is constructed to satisfy formula (D): $0.10 < f_w/f_1 < 0.25$, where $f_w$ is the focal distance of the entire lens system at a wide angle end, and $f_1$ is the focal distance of the first lens group 1G.

In such a manner, the basic configuration of the zoom lens 100 is described above.

It is desirable for the zoom lens 100 to satisfy formula (D'): $0.15 < f_w/f_1 < 0.20$.

It is desirable that when the point of focus of the zoom lens 100 is shifted from the infinity side to the near side and focused, only the fifth lens group is shifted toward the image side. This enables a focusing group (the fifth lens group 5G) to achieve a reduction in a size and weight, thereby reducing the burden on the focusing mechanism and achieving high-speed focus.

Further, it is desirable for the zoom lens 100 to satisfy formula (C): $-0.6 < 1-(\beta_{5T})^2 < -2.5$, and more desirably, formula (C'): $-5.5 < 1-(\beta_{5T})^2 < -2.9$, where $\beta_{5T}$ is an image formation magnification of the fifth lens group when focusing on infinity at the telephoto end.

Formula (C) regulates the sensitivity to image shift with respect to a focal shift at the time of focusing on infinity at the telephoto end in the fifth lens group 5G. If the zoom lens 100 is constructed in such a manner that the value of $1-(\beta_{5T})^2$ is lower than the lower limit defined by formula (C), the sensitivity to the image shift with respect to the focal shift of the fifth lens group 5G at the telephoto end will be excessively increased, which causes the amount of amplitude shift of the fifth lens group 5G for finding the best point of focus to be excessively reduced. As a result, problems such that it will become difficult to perform focus control, for example, the focal shift of the fifth lens group 5G becoming suspended, will arise. If the zoom lens 100 is constructed in such a manner that the value of $1-(\beta_{5T})^2$ exceeds the upper limit defined by formula (C), the sensitivity of the image shift with respect to the focal shift of the fifth lens group 5G will be acceptable at the telephoto end, but the sensitivity at the wide angle end will be excessively reduced. This will cause the amount of amplitude shift of the fifth lens group 5G for finding the best point of focus to be excessively increased. As a result, for example, problems, that abnormal noises are made by the focusing mechanism at the time of the focus shift, will arise.

The imaging apparatus 200 illustrated in FIG. 1 includes the zoom lens 100, and an imaging element 210 constituted of a CCD which images an optical image Hk (an optical image representing a subject H) formed through the zoom lens 100, a CMOS or the like. An imaging surface 211 of the imaging element 210 is an image formation position (an image formation surface Mk) of the imaging lens 100.

In this case, an optical member Dg is disposed between the most-image-side lens (as indicated by the item Se in the zoom lens 100 of FIG. 1) and the imaging surface 211.

Various optical members may be employed as the optical member Dg depending on the configuration of the imaging apparatus 200 with which the imaging lens 100 is equipped. For example, a single or a plurality of a member or members that correspond(s) to an imaging surface protection cover glass, an infrared cut filter, an ND filter and the like may be provided.

Hereinafter, Examples 1 through 5 of the zoom lens of the present invention will be specifically described with reference to FIGS. 2A, 2B . . . 6A, 6B, 7 . . . 11 and the like.

Each zoom lens of Examples 1 through 5 satisfies the configuration of the zoom lens 100 and includes the following constituent elements.

Each zoom lens of Examples 1 through 5 is constituted by a first lens group 1G consisting of three lenses, a second lens group 2G consisting of four lenses, a third lens group 3G consisting of five lenses, a fourth lens group 4G consisting of three lenses, and a fifth lens group 5G consisting of two lenses.

In the first lens group 1G, a first group-first lens L1, a first group-second lens L2, and a first group-third lens L3 are arranged in this order from the object side.

Further, in the second lens group 2G, a second lens group-first lens L4, a second lens group-second lens L5, a second lens group-third lens L6, and a second lens group-fourth lens L7 are arranged in this order from the object side.

Further, in the third lens group 3G, a third lens group-first lens L8, a third lens group-second lens L9, a third lens group-third lens L10, a third lens group-fourth lens L11, and a third lens group-fifth lens L12 are arranged in this order from the object side.

In the fourth lens group 4G, a fourth lens group-first lens L13, a fourth lens group-second lens L14, and a fourth lens group-third lens L15 are arranged in this order from the object side.

Further, in the fifth lens group 5G, a fifth group-first lens L16, and a fifth group-second lens L17 are arranged in this order from the object side.

The third lens group 3G consisting of five lenses as described above, is constructed to have three lenses (a third-a lens group 3aG having positive refractive power) arranged closest to the object side and two lenses arranged closest to the image side (a third-b lens group 3bG). The third-b lens group 3bG is constructed to be movable in a direction perpendicular to an optical axis (a direction in which an X-Y plane extends), which enables a camera shake correction function to work.

In this case, the third-a lens group 3aG consists of the third group-first lens L8, the third group-second lens L9, and the third group-third lens L10, and the third-b lens group 3bG consists of the third group-fourth lens L11 and the third group-fifth lens L12.

An aperture stop St is disposed between the second lens group 2G and the third lens group 3G and is designed to be moved in an optical axis direction Z1, integrally with the third lens group 3G at the time of varying magnification.

EXAMPLE 1

FIGS. 2A and 2B illustrate a zoom lens of Example 1. FIG. 2A is a detailed diagram illustrating the configuration of the zoom lens of Example 1. FIG. 2B illustrates a state in which the zoom setting of the zoom lens of Example 1 is set to the wide angle end (as indicated by "WIDE" in the Figure) at the upper part and a state in which the zoom setting thereof is set to the telephoto end (as indicated by "TELE" in the Figure) at the bottom part. Further, arrows indicate the paths of movements of the lens groups, respectively when magnification is changed from the wide angle end to the telephoto end.

In the fifth lens group 5G of the zoom lens of Example 1, two lenses, i.e., a negative lens and a positive lens are arranged in this order from the object side.

Further, Table 1A to be described later shows various data related to the zoom lens of Example 1. The upper part of Table 1A shows lens data, the middle part shows schematic specifications of the zoom lens, and the bottom part shows the focal length of each lens group.

In the lens data at the upper part of Table 1A, a surface number i represents the i-th (i=1, 2, 3, . . . ) lens surface or the like, and the number sequentially increases from the most-object side toward the image side. The aperture stop St and the optical member Dg are also listed in these lens data.

Radius Ri of curvature represents the radius of curvature of the i-th surface (i=1, 2, 3, . . . ). Distance Di between surfaces (i=1, 2, 3, . . . ) represents a distance between the i-th surface and an (i+1)th surface on the optical axis Z1. The item Ri and the item Di in the lens data correspond to the item Si (i=1, 2, 3, . . . ) representing a lens surface or the like.

In the column of distance Di between surfaces (i=1, 2, 3, . . . ), there are a case in which numeral values representing a distance between surfaces are listed and a case in which the item Dm (m is an integral number). Numbers in the item Dm correspond to a distance between surfaces (spatial distance), between the lens groups, and the distance between surfaces (spatial distance) varies depending on variable magnification ratios (zoom magnification).

Further, the item Nj represents the refractive index of a j-th (j=1, 2, 3, . . . ) optical element with respect to wavelength of 587.6 nm (the d-line), and numbers sequentially increase from the object side toward the image side. The item νj represents the Abbe number of the j-th optical element based on the d-line.

In the lens data of Table 1A, the unit of the radius of curvature and the distances between surfaces is mm. The radius of curvature is positive when a convex surface faces the object side and is negative when a convex surface faces the image side.

The optical system as described above is generally capable of maintaining a predetermined performance level in any of cases where the size of optical elements such as a lens or the like is proportionately increased or decreased, and therefore zoom lens in which the numbers of the entire lens data are proportionately increased or decreased can be Examples related to the present invention as well.

The middle part of Table 1A represents each value of a wide angle end (WIDE), the middle of varying magnification (MID), and a telephoto end (TELE), i.e., distances between lens groups: D5, D13, D23, D28 and D32; f: the focal length of the entire lens system (unit mm of each value); Fno: F number; and 2ω: whole angles of view (in "°" units).

Further, the bottom part of Table 1A represents the focal length of each group. In this case, $f_1$: the focal length of the first lens group 1G, $f_2$: the focal length of the second lens group 2G, $f_3$: the focal length of the third lens group 3G, $f_4$: the focal length of the fourth lens group 4G, $f_5$: the focal length of the fifth lens group 5G, $f_{3a}$: the focal length of the third-a lens group 3aG, and $f_{3b}$: the focal length of the third-b lens group 3bG.

The term "the third-b group (OIS)" (OIS: Optical Image Stabilization) described in Table 1A represents being capable of achieving the performance of the camera shake correction function by allowing the third-b lens group 3bG to move in a direction perpendicular to the optical axis (in a direction to which X-Y plane extends).

TABLE 1A

EXAMPLE 1

| SURFACE NUMBER | Ri | Di | Nj | νj | GROUP STRUCTURE |
|---|---|---|---|---|---|
| 1 | 85.7554 | 1.950 | 1.84661 | 23.9 | FIRST |
| 2 | 62.5697 | 9.119 | 1.49700 | 81.5 | GROUP |
| 3 | −31126.9375 | 0.100 | | | |
| 4 | 77.2118 | 4.299 | 1.61800 | 63.3 | |
| 5 | 186.7731 | D5 | | | |
| 6 | 108.0235 | 1.350 | 1.88300 | 40.8 | SECOND |
| 7 | 18.6071 | 8.337 | | | GROUP |
| 8 | −55.8960 | 1.000 | 1.88300 | 40.8 | |
| 9 | 66.9403 | 0.700 | | | |
| 10 | 37.4987 | 6.589 | 1.84661 | 23.9 | |
| 11 | −38.9747 | 0.362 | | | |
| 12 | −34.0881 | 1.000 | 1.75500 | 52.3 | |
| 13 | 105.4506 | D13 | | | |
| (APERTURE STOP)14 | ∞ | 1.000 | | | THIRD-a GROUP |
| 15 | 33.7005 | 3.568 | 1.56732 | 42.8 | |
| 16 | −52.6106 | 0.363 | | | |
| 17 | 28.4699 | 4.073 | 1.49700 | 81.5 | |
| 18 | −32.0211 | 0.900 | 1.90366 | 31.3 | |
| 19 | 211.4451 | 2.505 | | | |
| *20 | −67.2274 | 1.500 | 1.80348 | 40.4 | THIRD-b |
| 21 | 24.5327 | 1.041 | | | GROUP |
| 22 | 27.2898 | 2.358 | 1.84661 | 23.9 | (OIS) |
| 23 | 69.3194 | D23 | | | |
| *24 | 49.0350 | 4.377 | 1.51560 | 63.1 | FOURTH |
| *25 | −43.0727 | 0.169 | | | GROUP |
| 26 | 46.1728 | 1.000 | 1.84661 | 23.9 | |
| 27 | 22.9572 | 6.496 | 1.51680 | 64.2 | |
| 28 | −48.8859 | D28 | | | |
| *29 | 85.0541 | 1.500 | 1.80348 | 40.4 | FIFTH |
| *30 | 20.5630 | 0.099 | | | GROUP |
| 31 | 19.5078 | 2.277 | 1.92286 | 20.9 | |
| 32 | 25.9096 | D32 | | | |
| 33 | ∞ | 3.700 | 1.51680 | 64.2 | Dg |
| 34 | ∞ | | | | |

TABLE 1A-continued

EXAMPLE 1

| | WIDE | MID | TELE |
|---|---|---|---|
| D5 | 0.950 | 32.298 | 66.596 |
| D13 | 42.834 | 15.932 | 3.617 |
| D23 | 12.578 | 6.213 | 3.622 |
| D28 | 2.153 | 3.937 | 1.901 |
| D32 | 35.505 | 66.444 | 82.661 |
| f | 18.384 | 67.549 | 248.190 |
| Fno | 3.60 | 5.48 | 6.49 |
| 2ω [°] | 76.61 | 22.49 | 6.22 |
| $f_1$ | 111.303 | | |
| $f_2$ | −17.195 | | |
| $f_3$ | 89.768 | | |
| $f_4$ | 28.523 | | |
| $f_5$ | −59.029 | | |
| $f_{3a}$ | 33.607 | | |
| $f_{3b}$ (OIS) | −39.462 | | |

Table 1B shows aspheric coefficients of aspheric surfaces of the zoom lens of Example 1. In the lens data of Table 1A, the mark "★" attached to a surface number indicates that a surface represented by the surface number is an aspheric surface. Further, Table 1B shows the aspheric coefficients of aspheric surfaces corresponding to these surface numbers.

The aspheric coefficients represented in Table 1B are prepared to define aspheric shapes by being applied in the following aspheric equation.

$$Z = C \cdot h^2 / \{1 + (1 - K \cdot C^2 \cdot h^2)^{1/2}\} + \Sigma An \cdot h^n \quad \text{[Aspheric Equation 1]}$$

where

Z: the depth of an aspheric surface (mm)

h: the distance from the optical axis to a lens surface (height) (mm)

K: aspheric coefficients representing quadric surface

C: paraxial curvature=1/R (R: paraxial curvature radius)

An: n-dimensional (n is an integer not less than three) aspheric coefficient

TABLE 1B

ASPHERIC COEFFICIENT

SURFACE NUMBER

| SIGN | *20 | *24 | *25 | *29 | *30 |
|---|---|---|---|---|---|
| K | 1.000000E+00 | 1.000000E+00 | 1.000000E+00 | 1.000000E+00 | 1.000000E+00 |
| A3 | −6.660863E−06 | 2.113073E−05 | 1.195308E−05 | 6.668667E−07 | 1.051388E−05 |
| A4 | 1.068409E−05 | −1.787018E−05 | 9.213718E−07 | −1.182857E−07 | −3.423284E−06 |
| A5 | −6.114474E−07 | −3.133994E−07 | 2.202715E−08 | −9.254225E−09 | 7.184053E−07 |
| A6 | 3.008719E−08 | 1.883512E−07 | −6.561077E−10 | −4.950193E−10 | −1.065630E−08 |
| A7 | 2.785752E−09 | −2.494012E−08 | −1.302087E−10 | −1.901654E−11 | −4.565539E−09 |
| A8 | −7.187710E−11 | 1.247161E−09 | −1.087276E−11 | −1.551834E−13 | −1.629647E−11 |
| A9 | −1.749371E−11 | 9.724427E−14 | −6.432469E−13 | 7.118640E−14 | 4.500121E−11 |
| A10 | 5.214071E−13 | −1.350450E−12 | −2.148723E−14 | 1.063682E−14 | −1.679259E−12 |
| A11 | −9.928876E−17 | 9.672666E−16 | −1.039705E−15 | 1.136476E−15 | 1.043516E−15 |
| A12 | −1.891767E−16 | 1.223378E−17 | −3.166091E−17 | 1.069028E−16 | 7.735059E−17 |
| A13 | −6.521684E−17 | −4.164422E−18 | 1.294460E−18 | 9.376248E−18 | 6.733229E−18 |
| A14 | −1.390141E−17 | −7.285136E−19 | 3.747765E−19 | 7.834346E−19 | 6.654046E−19 |
| A15 | −1.714540E−18 | 7.231878E−20 | 8.216610E−20 | 2.319643E−19 | 2.466336E−19 |
| A16 | −2.682522E−19 | 4.235680E−21 | 9.394894E−21 | 1.747560E−20 | 2.657868E−20 |

FIG. 7 is a diagram showing spherical aberration, astigmatism, distortion, and lateral chromatic aberration at each of a wide angle end (WIDE), the middle of varying magnification (MID), and a telephoto end (TELE) of the zoom lens of Example 1. Further, aberrations of each light beam of the d-line and the g-line are shown in the Figure. The diagram of astigmatism represents aberrations with respect to sagittal image surfaces and tangential image surfaces.

As shown in FIG. 7, diagrams indicated by the symbols Wa, Ma, and Ta represents spherical aberration, diagrams indicated by the symbols Wb, Mb, and Tb represents astigmatism, diagrams indicated by the symbols Wc, Mc, and Tc represents distortion, and diagrams indicated by the symbols Wd, Md, and Td represents lateral chromatic aberration.

Table 6 as shown at the end of the description of the Examples represents values (values evaluated from mathematical expressions of formulas (D), and (C), individually) of formulas (D), and (C) for Examples 1 through 5, individually. The mathematical expression of each formula can be evaluated from various data and the like with respect to the zoom lenses in Tables 1A through 5A.

As can be seen from the above lens data and the like, the zoom lens of Example 1 has a high variable ratio, and yet is compact and capable of high performance.

FIGS. 2A and 2B illustrating a configuration of the zoom lens of Example 1, FIG. 7 illustrating aberrations of the zoom lens, Tables 1A & 1B representing the lens data and the like of the zoom lens, and Table 6 representing the values of each mathematical expression of formulas (D), and (C) are read in the same manner as in Examples 2 through 5 to be described later, and therefore detailed descriptions thereof will be omitted.

EXAMPLE 2

FIGS. 3A and 3B shows a zoom lens of Example 2. FIG. 3A is a diagram illustrating the specific configuration of the zoom lens of Example 2. FIG. 3B is related to the zoom lens of Example 2, and illustrates a state in which the zoom setting is set to a wide angle end (as indicated by "WIDE" in the Figure) at the upper part and a state in which the zoom setting thereof is set to a telephoto end (as indicated by "TELE" in the Figure) at the bottom part. Further, arrows indicate the paths of movements of the lens groups, respectively when magnification is changed from the wide angle end to the telephoto end.

In the fifth lens group 5G of the zoom lens of Example 2, two lenses, i.e., a positive lens and a negative lens are arranged in this order from the object side.

Further, Table 2A shows various data related to the zoom lens of Example 2. The upper part of Table 2A shows lens data, the middle part shows schematic specifications of the zoom lens, and the bottom part shows the focal length of each lens group.

TABLE 2A

EXAMPLE 2

| SURFACE NUMBER | Ri | Di | Nj | vj | GROUP STRUCTUER |
|---|---|---|---|---|---|
| 1 | 85.2292 | 2.520 | 1.84661 | 23.9 | FIRST |
| 2 | 61.7335 | 9.054 | 1.49700 | 81.5 | GROUP |
| 3 | −1963.5475 | 0.100 | | | |
| 4 | 66.8404 | 4.168 | 1.60300 | 65.4 | |
| 5 | 147.8987 | D5 | | | |
| 6 | 88.0438 | 1.400 | 1.88300 | 40.8 | SECOND |
| 7 | 18.3402 | 8.245 | | | GROUP |
| 8 | −50.9539 | 1.050 | 1.83481 | 42.7 | |
| 9 | 63.5833 | 1.045 | | | |
| 10 | 37.5330 | 6.423 | 1.84661 | 23.9 | |
| 11 | −37.5330 | 0.405 | | | |
| 12 | −32.6020 | 1.050 | 1.77250 | 49.6 | |
| 13 | 97.2521 | D13 | | | |
| (APERTURE STOP)14 | ∞ | 1.000 | | | THIRD-a GROUP |
| 15 | 33.0761 | 3.238 | 1.54814 | 45.8 | |
| 16 | −58.1129 | 0.218 | | | |
| 17 | 29.9896 | 4.828 | 1.49700 | 81.5 | |
| 18 | −29.9896 | 0.900 | 1.85026 | 32.3 | |
| 19 | 200.1256 | 4.148 | | | |
| *20 | −64.3421 | 1.500 | 1.80168 | 40.7 | THIRD-b |
| *21 | 24.7941 | 0.835 | | | GROUP |
| 22 | 27.9314 | 2.293 | 1.84661 | 23.9 | (OIS) |
| 23 | 67.4658 | D23 | | | |
| *24 | 52.0924 | 4.603 | 1.51530 | 62.8 | FOURTH |
| *25 | −41.7940 | 0.118 | | | GROUP |
| 26 | 48.9063 | 1.050 | 1.75520 | 27.5 | |
| 27 | 23.5612 | 5.631 | 1.48749 | 70.2 | |
| 28 | −52.7318 | D28 | | | |
| 29 | −77.6900 | 2.362 | 1.80518 | 25.4 | FIFTH |
| 30 | −34.1433 | 1.323 | | | GROUP |
| *31 | −38.3946 | 1.500 | 1.80168 | 40.7 | |
| *32 | 175.1091 | D32 | | | |
| 33 | ∞ | 5.200 | 1.51680 | 64.2 | Dg |
| 34 | ∞ | | | | |

| | WIDE | MID | TELE |
|---|---|---|---|
| D5 | 0.900 | 34.251 | 61.985 |
| D13 | 43.622 | 17.798 | 3.965 |
| D23 | 10.401 | 5.906 | 3.496 |
| D28 | 3.770 | 5.315 | 1.700 |
| D32 | 33.109 | 60.979 | 85.617 |
| f | 18.388 | 67.562 | 248.238 |
| Fno | 3.60 | 5.18 | 6.47 |
| 2ω [°] | 76.59 | 22.60 | 6.27 |
| $f_1$ | 105.536 | | |
| $f_2$ | −16.856 | | |
| $f_3$ | 97.458 | | |
| $f_4$ | 29.520 | | |
| $f_5$ | −84.482 | | |
| $f_{3a}$ | 35.192 | | |
| $f_{3b}$ (OIS) | −37.423 | | |

Table 2B shows aspheric coefficients of aspheric surfaces of the zoom lens of Example 2.

TABLE 2B

ASPHERIC COEFFICIENT

SURFACE NUMBER

| SIGN | *20 | *21 | *24 | *25 | *31 | *32 |
|---|---|---|---|---|---|---|
| K | 1.000000E+00 | 1.000000E+00 | 1.000000E+00 | 1.000000E+00 | 1.000000E+00 | 1.000000E+00 |
| A3 | −6.214685E−06 | 1.210237E−06 | 2.670345E−05 | 1.418960E−05 | −6.078072E−06 | 7.219238E−07 |
| A4 | 1.178008E−05 | −2.059917E−07 | −1.699876E−05 | 3.117539E−07 | −8.397924E−08 | −1.310513E−07 |
| A5 | −5.734545E−07 | −7.148778E−09 | −2.869234E−07 | 2.819776E−09 | −3.195286E−07 | −3.857289E−09 |
| A6 | 2.988894E−08 | 1.380535E−10 | 1.883256E−07 | −7.772038E−10 | −4.462125E−09 | −5.848393E−10 |
| A7 | 2.617898E−09 | 2.608762E−11 | −2.502808E−08 | −9.142656E−11 | 2.561994E−09 | −7.783658E−11 |

TABLE 2B-continued

ASPHERIC COEFFICIENT

| | SURFACE NUMBER | | | | | |
|---|---|---|---|---|---|---|
| SIGN | *20 | *21 | *24 | *25 | *31 | *32 |
| A8 | −9.134118E−11 | 1.435216E−13 | 1.237420E−09 | −6.908198E−12 | 7.007254E−11 | −7.925124E−12 |
| A9 | −1.920589E−11 | −3.192440E−13 | −6.986446E−13 | −4.003267E−13 | −2.680817E−11 | −7.016044E−13 |
| A10 | 3.923019E−13 | −5.843137E−14 | −1.406596E−12 | −1.483360E−14 | 9.907504E−13 | −5.825802E−14 |
| A11 | −7.929852E−15 | −7.084585E−15 | −2.653633E−15 | −1.835598E−15 | −9.622458E−15 | −4.777413E−15 |
| A12 | −6.308512E−16 | −6.646965E−16 | −2.176749E−16 | −2.125550E−16 | −9.379487E−16 | −4.039401E−16 |
| A13 | −5.271484E−17 | −4.473916E−17 | −2.116950E−17 | −2.258551E−17 | −8.488742E−17 | −3.628087E−17 |
| A14 | −2.605892E−18 | −6.306065E−19 | −2.497013E−18 | −2.231667E−18 | −7.080190E−18 | −3.496352E−18 |
| A15 | 1.622770E−18 | 4.767090E−19 | −2.199383E−19 | −3.898770E−19 | −6.276121E−19 | −8.095367E−19 |
| A16 | 3.760341E−19 | 1.155446E−19 | −2.569275E−20 | −4.124631E−20 | −3.345415E−20 | −9.331008E−20 |

FIG. 8 is a diagram showing spherical aberration, astigmatism, distortion, and lateral chromatic aberration at each of a wide angle end (WIDE), the middle of varying magnification (MID), and a telephoto end (TELE) of the zoom lens of Example 2.

EXAMPLE 3

FIGS. 4A and 4B show a zoom lens of Example 3. FIG. 4A is a diagram illustrating the specific configuration of the zoom lens of Example 3. FIG. 4B is related to the zoom lens of Example 3, and illustrates a state in which the zoom setting is set to a wide angle end (as indicated by "WIDE" in the Figure) at the upper part and a state in which the zoom setting thereof is set to a telephoto end (as indicated by "TELE" in the Figure) at the bottom part. Further, arrows indicate the paths of movement of the lens groups, respectively when magnification is changed from the wide angle end to the telephoto end.

In the fifth lens group 5G of the zoom lens of Example 3, two lenses, i.e., a positive lens and a negative lens, are arranged in this order from the object side.

Further, Table 3A shows various data related to the zoom lens of Example 3. The upper part of Table 3A shows lens data, the middle part shows schematic specifications of the zoom lens, and the bottom part shows the focal length of each lens group.

TABLE 3A

EXAMPLE 3

| SURFACE NUMBER | Ri | Di | Nj | vj | GROUP STRUCTURE |
|---|---|---|---|---|---|
| 1 | 86.1227 | 1.650 | 1.84661 | 23.9 | FIRST |
| 2 | 62.0701 | 9.553 | 1.49700 | 81.5 | GROUP |
| 3 | −4250.8858 | 0.200 | | | |
| 4 | 69.0201 | 5.134 | 1.61800 | 63.3 | |
| 5 | 173.7706 | D5 | | | |
| 6 | 143.9195 | 1.250 | 1.88300 | 40.8 | SECOND |
| 7 | 17.9097 | 8.359 | | | GROUP |
| *8 | −54.1875 | 0.200 | 1.52771 | 41.8 | |
| 9 | −52.5929 | 1.000 | 1.80400 | 46.6 | |
| 10 | 61.2864 | 1.229 | | | |
| 11 | 38.6886 | 5.875 | 1.84661 | 23.9 | |
| 12 | −38.4723 | 1.010 | 1.80400 | 46.6 | |
| 13 | 99.9343 | D13 | | | |
| (APERTURE STOP)14 | ∞ | 1.000 | | | THIRD-a GROUP |
| 15 | 32.7747 | 3.500 | 1.54814 | 45.8 | |
| 16 | −52.1190 | 1.172 | | | |
| 17 | 28.6007 | 4.608 | 1.49700 | 81.5 | |
| 18 | −31.7142 | 1.000 | 1.90366 | 31.3 | |
| 19 | 247.9630 | 2.532 | | | |
| *20 | −62.9067 | 1.500 | 1.80348 | 40.4 | THIRD-b |
| 21 | 24.4096 | 1.000 | | | GROUP |
| 22 | 26.9299 | 2.518 | 1.84661 | 23.9 | (OIS) |
| 23 | 65.6490 | D23 | | | |
| *24 | 49.2954 | 4.978 | 1.51560 | 63.1 | FOURTH |
| *25 | −44.8007 | 1.459 | | | GROUP |
| 26 | 47.4064 | 0.900 | 1.84661 | 23.9 | |
| 27 | 23.0755 | 6.115 | 1.51680 | 64.2 | |
| 28 | −45.9160 | D28 | | | |
| 29 | −225.5534 | 2.848 | 1.84661 | 23.9 | FIFTH |
| 30 | −35.6067 | 0.500 | | | GROUP |
| *31 | −39.1114 | 1.500 | 1.80348 | 40.4 | |
| *32 | 54.4009 | D32 | | | |
| 33 | ∞ | 3.700 | 1.51680 | 64.2 | Dg |
| 34 | ∞ | | | | |

| | WIDE | MID | TELE |
|---|---|---|---|
| D5 | 0.999 | 31.879 | 61.061 |
| D13 | 42.746 | 17.373 | 4.203 |
| D23 | 11.516 | 5.965 | 3.499 |
| D28 | 1.951 | 3.394 | 1.885 |
| D32 | 35.490 | 64.031 | 78.012 |
| f | 18.382 | 64.988 | 229.769 |
| Fno | 3.62 | 5.22 | 6.08 |
| 2ω [°] | 76.61 | 23.33 | 6.73 |
| $f_1$ | 103.033 | | |
| $f_2$ | −16.513 | | |
| $f_3$ | 87.566 | | |
| $f_4$ | 29.127 | | |
| $f_5$ | −66.647 | | |
| $f_{3a}$ | 33.407 | | |
| $f_{3b}$ (OIS) | −37.492 | | |

Table 3B shows aspheric coefficients of aspheric surfaces of the zoom lens of Example 3.

TABLE 3B

ASPHERIC COEFFICIENT

| | SURFACE NUMBER | | | | | |
|---|---|---|---|---|---|---|
| SIGN | *8 | *20 | *24 | *25 | *31 | *32 |
| K | 1.464546E+00 | 1.000000E+00 | 1.000000E+00 | 1.000000E+00 | 1.000000E+00 | 1.000000E+00 |
| A3 | 0.000000E+00 | −6.784837E−06 | 2.196427E−05 | 1.195660E−05 | −1.149323E−05 | −1.143922E−06 |

TABLE 3B-continued

ASPHERIC COEFFICIENT

SURFACE NUMBER

| SIGN | *8 | *20 | *24 | *25 | *31 | *32 |
|---|---|---|---|---|---|---|
| A4 | 2.212057E−06 | 1.073941E−05 | −1.784348E−05 | 8.656127E−07 | −3.692099E−07 | 8.049956E−10 |
| A5 | 0.000000E+00 | −6.120021E−07 | −3.189917E−07 | 2.476411E−08 | −3.237427E−07 | −3.487018E−10 |
| A6 | −8.509320E−09 | 2.983909E−08 | 1.875408E−07 | −4.076491E−11 | −4.237706E−09 | −1.612101E−10 |
| A7 | 0.000000E+00 | 2.765409E−09 | −2.501350E−08 | −6.934857E−11 | 2.612386E−09 | −2.141371E−11 |
| A8 | 1.827402E−11 | −7.300686E−11 | 1.241716E−09 | −6.189639E−12 | 7.725014E−11 | −1.924803E−12 |
| A9 | 0.000000E+00 | −1.754200E−11 | −2.534825E−13 | −3.333725E−13 | −2.592973E−11 | −1.269553E−13 |
| A10 | −1.356278E−13 | 5.200665E−13 | −1.369651E−12 | −3.716054E−15 | 1.087591E−12 | −4.597426E−15 |
| A11 | | 4.577131E−17 | 2.121105E−16 | −2.243534E−16 | 2.093262E−16 | 3.219858E−16 |
| A12 | | −1.519797E−16 | 1.643937E−17 | −1.434839E−17 | −8.269620E−18 | 9.836844E−17 |
| A13 | | −5.440776E−17 | 1.428068E−18 | −9.633478E−19 | −2.966776E−18 | 1.494300E−17 |
| A14 | | −1.137249E−17 | 1.494776E−19 | −8.031938E−20 | −4.355006E−19 | 1.856954E−18 |

FIG. 9 is a diagram showing spherical aberration, astigmatism, distortion, and lateral chromatic aberration at each of a wide angle end (WIDE), the middle of varying magnification (MID), and a telephoto end (TELE) of the zoom lens of Example 3.

EXAMPLE 4

FIGS. 5A and 5B show a zoom lens of Example 4. FIG. 5A illustrates the specific configuration of the zoom lens of Example 4. FIG. 5B is related to the zoom lens of Example 4, and illustrates a state in which the zoom setting is set to a wide angle end (as indicated by "WIDE" in the Figure) at the upper part and a state in which the zoom setting thereof is set to a telephoto end (as indicated by "TELE" in the Figure) at the bottom part. Further, arrows indicate the paths of movement of the lens groups, respectively when magnification is changed from the wide angle end to the telephoto end.

In the fifth lens group 5G of the zoom lens of Example 4, two lenses, i.e., a positive lens and a negative lens, are arranged in this order from the object side.

Further, Table 4A shows various data related to the zoom lens of Example 4. The upper part of Table 4A shows lens data, the middle part shows schematic specifications of the zoom lens, and the bottom part shows the focal length of each lens group.

TABLE 4A

EXAMPLE 4

| SURFACE NUMBER | Ri | Di | Nj | vj | GROUP STRUCTURE |
|---|---|---|---|---|---|
| 1 | 84.9463 | 1.950 | 1.84661 | 23.9 | FIRST |
| 2 | 62.2446 | 8.693 | 1.49700 | 81.5 | GROUP |
| 3 | ∞ | 0.100 | | | |
| 4 | 68.3452 | 4.363 | 1.60300 | 65.4 | |
| 5 | 153.8323 | D5 | | | |
| 6 | 89.2120 | 1.350 | 1.88300 | 40.8 | SECOND |
| 7 | 18.2963 | 8.233 | | | GROUP |
| 8 | −58.1632 | 1.000 | 1.88300 | 40.8 | |
| 9 | 67.7426 | 0.948 | | | |

TABLE 4A-continued

EXAMPLE 4

| | | | | | |
|---|---|---|---|---|---|
| 10 | 37.5173 | 6.506 | 1.84661 | 23.9 | |
| 11 | −38.5206 | 0.408 | | | |
| 12 | −33.7911 | 1.000 | 1.77250 | 49.6 | |
| 13 | 99.4178 | D13 | | | |
| (APERTURE STOP)14 | ∞ | 1.000 | | | THIRD-a GROUP |
| 15 | 33.6716 | 3.293 | 1.51742 | 52.4 | |
| 16 | −58.3051 | 0.100 | | | |
| 17 | 28.2935 | 4.126 | 1.49700 | 81.5 | |
| 18 | −31.9738 | 0.900 | 1.83400 | 37.2 | |
| 19 | 127.3405 | 2.569 | | | |
| 20 | −68.3981 | 2.272 | 1.84661 | 23.9 | THIRD-b |
| 21 | −26.8082 | 0.886 | | | GROUP |
| 22 | −24.8406 | 1.500 | 1.80348 | 40.4 | (OIS) |
| *23 | 62.6811 | D23 | | | |
| *24 | 49.8918 | 4.452 | 1.51560 | 63.1 | FOURTH |
| *25 | −42.8733 | 0.100 | | | GROUP |
| 26 | 53.2553 | 1.000 | 1.80518 | 25.4 | |
| 27 | 23.3404 | 5.973 | 1.51823 | 58.9 | |
| 28 | −46.7603 | D28 | | | |
| 29 | −81.9572 | 2.357 | 1.80518 | 25.4 | FIFTH |
| 30 | −34.7267 | 1.493 | | | GROUP |
| *31 | −38.2183 | 1.500 | 1.80348 | 40.4 | |
| *32 | 179.9979 | D33 | | | |
| 33 | ∞ | 4.900 | 1.51680 | 64.2 | Dg |
| 34 | ∞ | | | | |

| | WIDE | MID | TELE |
|---|---|---|---|
| D5 | 0.900 | 33.799 | 63.266 |
| D13 | 44.713 | 17.634 | 3.566 |
| D23 | 11.185 | 6.816 | 4.357 |
| D28 | 3.245 | 4.848 | 1.970 |
| D32 | 34.996 | 63.954 | 86.941 |
| f | 18.366 | 67.481 | 247.941 |
| Fno | 3.60 | 5.26 | 6.55 |
| 2ω [°] | 76.64 | 22.68 | 6.28 |
| $f_1$ | 107.872 | | |
| $f_2$ | −17.446 | | |
| $f_3$ | 116.489 | | |
| $f_4$ | 29.082 | | |
| $f_5$ | −85.750 | | |
| $f_{3a}$ | 37.832 | | |
| $f_{3b}$ (OIS) | −39.192 | | |

Table 4B shows aspheric coefficients of aspheric surfaces of the zoom lens of Example 4.

TABLE 4B

ASPHERIC COEFFICIENT

| SIGN | *23 | *24 | *25 | *31 | *32 |
|---|---|---|---|---|---|
| K | 1.000000E+00 | 1.000000E+00 | 1.000000E+00 | 1.000000E+00 | 1.000000E+00 |
| A3 | 1.288744E−05 | 2.647809E−05 | 1.085607E−05 | −7.403052E−06 | −1.039624E−07 |
| A4 | −1.078292E−05 | −1.725827E−05 | 4.339778E−07 | −1.719981E−07 | −1.241135E−07 |
| A5 | 6.382901E−07 | −2.955264E−07 | 7.445503E−09 | −3.195104E−07 | −6.411543E−09 |
| A6 | −2.635804E−08 | 1.884390E−07 | −7.830304E−10 | −4.172605E−09 | −7.019777E−10 |
| A7 | −2.463874E−09 | −2.498717E−08 | −1.006144E−10 | 2.599459E−09 | −6.791905E−11 |
| A8 | 9.303492E−11 | 1.241227E−09 | −7.050127E−12 | 7.428064E−11 | −5.579190E−12 |
| A9 | 1.836592E−11 | −4.496962E−13 | −3.044782E−13 | −2.634935E−11 | −4.226272E−13 |
| A10 | −5.521081E−13 | −1.394620E−12 | 3.515842E−15 | 1.038713E−12 | −3.175412E−14 |
| A11 | −1.312550E−14 | −2.307759E−15 | 5.035691E−16 | −4.914561E−15 | −2.523663E−15 |
| A12 | −1.649716E−15 | −2.136162E−16 | 3.668331E−17 | −5.118335E−16 | −2.219919E−16 |
| A13 | −1.438455E−16 | −1.859723E−17 | 1.097923E−18 | −5.040249E−17 | −2.163300E−17 |
| A14 | −6.585779E−18 | −1.568050E−18 | −1.859078E−19 | −4.774574E−18 | −2.263951E−18 |
| A15 | −4.147342E−19 | −2.121945E−20 | −2.309610E−19 | −5.390733E−19 | −6.968129E−19 |
| A16 | 1.147946E−19 | 8.062655E−21 | −3.078231E−20 | −4.101269E−20 | −8.198580E−20 |

FIG. 10 is a diagram showing spherical aberration, astigmatism, distortion, and lateral chromatic aberration at each of a wide angle end (WIDE), the middle of varying magnification (MID), and a telephoto end (TELE) of the zoom lens of Example 4.

EXAMPLE 5

FIGS. 6A and 6B show a zoom lens of Example 5. FIG. 6A illustrates the specific configuration of the zoom lens of Example 5. FIG. 6B is related to the zoom lens of Example 5, and illustrates a state in which the zoom setting is set to a wide angle end (as indicated by "WIDE" in the Figure) at the upper part and a state in which the zoom setting thereof is set to a telephoto end (as indicated by "TELE" in the Figure) at the bottom part. Further, arrows indicate the paths of movement of the lens groups, respectively when magnification is changed from the wide angle end to the telephoto end.

In the fifth lens group 5G of the zoom lens of Example 5, two lenses, i.e., a positive lens and a negative lens are arranged in this order from the object side.

Further, Table 5A shows various data related to the zoom lens of Example 5. The upper part of Table 5A shows lens data, the middle part shows schematic specifications of the zoom lens, and the bottom part shows the focal length of each lens group.

TABLE 5A

EXAMPLE 5

| SURFACE NUMBER | Ri | Di | Nj | νj | GROUP STRUCTURE |
|---|---|---|---|---|---|
| 1 | 85.2992 | 2.520 | 1.84661 | 23.9 | FIRST |
| 2 | 61.8500 | 9.114 | 1.49700 | 81.5 | GROUP |
| 3 | −2375.7864 | 0.100 | | | |
| 4 | 66.8941 | 4.269 | 1.60300 | 65.4 | |
| 5 | 146.5034 | D5 | | | |
| 6 | 87.8998 | 1.400 | 1.88300 | 40.8 | SECOND |
| 7 | 18.3570 | 8.315 | | | GROUP |

TABLE 5A-continued

EXAMPLE 5

| | | | | | |
|---|---|---|---|---|---|
| 8 | −51.0001 | 1.050 | 1.83481 | 42.7 | |
| 9 | 63.6139 | 0.815 | | | |
| 10 | 37.4113 | 6.407 | 1.84666 | 23.8 | |
| 11 | −37.4113 | 0.388 | | | |
| 12 | −32.5753 | 1.050 | 1.77250 | 49.6 | |
| 13 | 98.4906 | D13 | | | |
| (APERTURE STOP)14 | ∞ | 1.100 | | | THIRD-a GROUP |
| 15 | 34.2381 | 3.329 | 1.54814 | 45.8 | |
| 16 | −60.1143 | 0.937 | | | |
| 17 | 27.0475 | 4.232 | 1.49700 | 81.5 | |
| 18 | −33.1140 | 0.900 | 1.85026 | 32.3 | |
| 19 | 163.6420 | 3.836 | | | |
| *20 | −63.3026 | 1.500 | 1.80168 | 40.7 | THIRD-b |
| *21 | 24.7365 | 0.864 | | | GROUP |
| 22 | 28.0299 | 2.277 | 1.84666 | 23.8 | (OIS) |
| 23 | 66.7227 | D23 | | | |
| *24 | 52.7776 | 4.675 | 1.51530 | 62.8 | FOURTH |
| *25 | −42.2885 | 0.105 | | | GROUP |
| 26 | 48.3349 | 1.050 | 1.75520 | 27.5 | |
| 27 | 23.5950 | 5.625 | 1.48749 | 70.2 | |
| 28 | −52.9320 | D28 | | | |
| 29 | −77.2285 | 2.360 | 1.80518 | 25.4 | FIFTH |
| 30 | −34.0317 | 1.053 | | | GROUP |
| *31 | −38.4236 | 1.500 | 1.80168 | 40.7 | |
| *32 | 175.0302 | D32 | | | |
| 33 | ∞ | 5.200 | 1.51680 | 64.2 | Dg |
| 34 | ∞ | | | | |

| | WIDE | MID | TELE |
|---|---|---|---|
| D5 | 0.900 | 36.423 | 62.766 |
| D13 | 43.473 | 17.944 | 3.610 |
| D23 | 10.708 | 6.338 | 3.715 |
| D28 | 3.842 | 5.548 | 1.698 |
| D32 | 33.106 | 58.073 | 84.416 |
| f | 18.389 | 67.564 | 248.247 |
| Fno | 3.62 | 5.02 | 6.39 |
| 2ω [°] | 76.66 | 22.61 | 6.27 |
| $f_1$ | 106.443 | | |
| $f_2$ | −16.902 | | |
| $f_3$ | 94.599 | | |
| $f_4$ | 29.607 | | |
| $f_5$ | −84.036 | | |
| $f_{3a}$ | 34.301 | | |
| $f_{3b}$ (OIS) | −36.710 | | |

Table 5B shows aspheric coefficients of aspheric surfaces of the zoom lens of Example 5.

TABLE 5B

ASPHERIC COEFFICIENT

| SIGN | SURFACE NUMBER | | | | | |
|---|---|---|---|---|---|---|
| | *20 | *21 | *24 | *25 | *31 | *32 |
| K   | 1.000000E+00  | 1.000000E+00  | 1.000000E+00  | 1.000000E+00  | 1.000000E+00  | 1.000000E+00 |
| A3  | -6.165192E-06 | 1.136414E-06  | 2.646484E-05  | 1.455922E-05  | -5.608010E-06 | 3.111280E-07 |
| A4  | 1.180918E-05  | -2.391292E-07 | -1.700884E-05 | 3.247792E-07  | -6.243737E-08 | -1.509737E-07 |
| A5  | -5.712797E-07 | -9.755106E-09 | -2.879359E-07 | 3.790736E-09  | -3.186333E-07 | -4800208E-09 |
| A6  | 3.004106E-08  | -5.784070E-11 | 1.882504E-07  | -7.189621E-10 | -4.429101E-09 | -6.392048E-10 |
| A7  | 2.628840E-09  | 1.065292E-11  | -2.503214E-08 | -8.915027E-11 | 2.562357E-09  | -8.139704E-11 |
| A8  | -9.058174E-11 | -1.062813E-12 | 1.237303E-09  | -6.929168E-12 | 6.993044E-11  | -8.143708E-12 |
| A9  | -1.916284E-11 | -4.032273E-13 | -6.914544E-13 | -4.165896E-13 | -2.683328E-11 | -7.108067E-13 |
| A10 | 3.931210E-13  | -6.248737E-14 | -1.404954E-12 | -1.706208E-14 | 9.877237E-13  | -5.801155E-14 |
| A11 | -8.205763E-15 | -6.993822E-15 | -2.471879E-15 | -2.065580E-15 | -9.923479E-15 | -4.652135E-15 |
| A12 | -6.918798E-16 | -6.032048E-16 | -2.028307E-16 | -2.332995E-16 | -9.630020E-16 | -3.833882E-16 |
| A13 | -6.145538E-17 | -3.361798E-17 | -2.032344E-17 | -2.430529E-17 | -8.645582E-17 | -3.363706E-17 |
| A14 | -3.613976E-18 | 8.786762E-19  | -2.491248E-18 | -2.366453E-18 | -7.105990E-18 | -3.193681E-18 |
| A15 | 1.528779E-18  | 6.479148E-19  | -2.276198E-19 | -4.001489E-19 | -6.139199E-19 | -7.773001E-19 |
| A16 | 3.702179E-19  | 1.315589E-19  | -2.724708E-20 | -4.204166E-20 | -3.018856E-20 | -9.005424E-20 |

FIG. 11 is a diagram showing spherical aberration, astigmatism, distortion, and lateral chromatic aberration at each of a wide angle end (WIDE), the middle of varying magnification (MID), and a telephoto end (TELE) of the zoom lens of Example 5.

The zoom lens of Example 5, which is constructed in such a manner, can have a high variable magnification ratio, and yet be compact and capable of high performance.

TABLE 6

|  | EXAMPLE 1 | EXAMPLE 2 | EXAMPLE 3 | EXAMPLE 4 | EXAMPLE 5 |
|---|---|---|---|---|---|
| FORMULA(D) | 0.165 | 0.174 | 0.178 | 0.170 | 0.173 |
| FORMULA(C) | -5.00 | -3.32 | -3.99 | -3.30 | -3.30 |

The present invention is not limited to the embodiments and the examples described above, and various modifications are possible. For example, values, such as the radius of curvature of each lens element, distances between surfaces, and refractive indices, are not limited to the values in the numerical examples shown in the Tables, but may be other values.

What is claimed is:

1. A zoom lens, substantially consisting of:
   a first lens group having positive refractive power;
   a second lens group having negative refractive power;
   a third lens group having positive refractive power;
   a fourth lens group having positive refractive power; and
   a fifth lens group having negative refractive power, which are arranged in this order from an object side of the zoom lens,
   wherein when varying magnification from a wide angle end to a telephoto end, a distance between the first lens group and the second lens group is consistently increased, a distance between the second lens group and the third lens group is consistently decreased, a distance between the third lens group and the fourth lens group is consistently decreased, and a distance between the fourth lens group and the fifth lens group is changed, while all of the lens groups are moved with respect to an image formation position,
   wherein the following formulas (Ca) and (D) are satisfied:

$$-5.00 \leq 1-(\beta_{5T})^2 < -2.5 \quad \text{(Ca)}$$

$$0.10 < f_w/f_1 < 0.25 \quad \text{(D), where}$$

$\beta_{5T}$: an image formation magnification of the fifth lens group when focusing on infinity at the telephoto end;
   $f_w$: a focal length of the entire lens system at the wide angle end; and
   $f_1$: a focal length of the first lens group.

2. The zoom lens as defined in claim 1, wherein the following formula (Cb) is satisfied:

$$-5.00 \leq 1-(\beta_{5T})^2 < -2.9 \quad \text{(Cb)}.$$

3. An imaging apparatus comprising:
   the zoom lens as defined in claim 1.

4. The zoom lens as defined in claim 1, wherein when the point of focus is shifted from an infinity side to a near side and focused, only the fifth lens group is shifted to the image side.

5. The zoom lens as defined in claim 4, wherein the following formula (Cb) is satisfied:

$$-5.00 \leq 1-(\beta_{5T})^2 < -2.9 \quad \text{(Cb)}.$$

6. The zoom lens as defined in claim 1, wherein the following formula (D') is satisfied:

$$0.15 < f_w/f_1 < 0.20 \quad \text{(D')}.$$

7. The zoom lens, as defined in claim 6, wherein when the point of focus is shifted from an infinity side to a near side and focused, only the fifth lens group is shifted to the image side.

8. The zoom lens as defined in claim 6, wherein the following formula (Cb) is satisfied:

$$-5.00 \leq 1-(\beta_{5T})^2 < -2.9 \quad \text{(Cb)}.$$

* * * * *